United States Patent
Urata et al.

(10) Patent No.: US 6,931,204 B2
(45) Date of Patent: Aug. 16, 2005

(54) VACUUM HEAT INSULATOR, HOT INSULATING DEVICE USING VACUUM HEAT INSULATOR, AND ELECTRIC WATER HEATER

(75) Inventors: Takayuki Urata, Hyogo (JP); Mitsuhiro Sano, Osaka (JP); Akihiro Umeda, Nara (JP); Kiyoyoshi Takada, Hyogo (JP); Izuo Hirota, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 246 days.

(21) Appl. No.: 10/345,378

(22) Filed: Jan. 16, 2003

(65) Prior Publication Data

US 2003/0134078 A1 Jul. 17, 2003

Related U.S. Application Data

(62) Division of application No. 09/608,169, filed on Jun. 30, 2000.

(30) Foreign Application Priority Data

Jun. 19, 1999 (JP) .......................................... 11-185426
Jul. 21, 1999 (JP) .......................................... 11-205899
Nov. 17, 1999 (JP) .......................................... 11-326340

(51) Int. Cl.[7] .............................................. A47J 27/00
(52) U.S. Cl. ........................... 392/441; 392/449; 428/69
(58) Field of Search ................................ 392/441, 449; 428/69, 172, 35.3

(56) References Cited

U.S. PATENT DOCUMENTS 4,512,246 A * 4/1985 Chappell et al. ............... 99/312
4,669,632 A * 6/1987 Kawasaki et al. ........... 428/172
4,745,015 A 5/1988 Cheng et al.
5,006,689 A 4/1991 Kurachi et al.
5,798,154 A * 8/1998 Bryan ........................ 428/35.3
5,866,228 A 2/1999 Awata
6,436,505 B2 * 8/2002 Kuroda et al. ................ 428/69

FOREIGN PATENT DOCUMENTS

| JP | 4-51357 | 12/1992 |
| JP | 07-091594 | 4/1995 |
| JP | 07-167377 | 7/1995 |
| JP | 11-022896 | 1/1999 |
| JP | 11-290210 | 10/1999 |
| JP | 11-309069 | 11/1999 |
| JP | 2000-005063 | 1/2000 |
| JP | 2000-005067 | 1/2000 |

* cited by examiner

Primary Examiner—Thor S. Campbell
(74) Attorney, Agent, or Firm—McDermott Will & Emery LLP

(57) ABSTRACT

In this vacuum heat insulator, an excellent heat insulating performance is obtained even at high temperature, and this excellent heat insulating performance is maintained for a long period. The hot insulating device and electric water heater using this vacuum heat insulator exhibit an excellent hot insulating performance, and are decreased in the power consumption for hot insulation. The vacuum heat insulator includes a laminate bag, and an insulating core placed in the laminate bag, and the inside of the laminate bag is evacuated in a vacuum state. The laminate bag is made of a laminate film. The laminate film includes a support layer, a deposition layer evaporated on the surface of the support layer, a protective layer placed at the surface side of the deposition layer, and a seal layer placed at the back side of the deposition layer. The deposition layer is formed of at least one material of metal and metal oxide. In this laminate film, (i) the support layer has a plastic film having a glass transition point of 87° C. or higher, (ii) the protective layer has a plastic film having a glass transition point of 87° C. or higher, (iii) the deposition layer has a property of transmitting high frequency magnetic field, or (iv) the laminate bag has a seal portion formed by junction of the seal layer, and the laminate film further as a metal foil placed at a position excluding the seal portion.

7 Claims, 15 Drawing Sheets

VACUUM HEAT INSULATOR, HOT INSULATING DEVICE USING VACUUM HEAT INSULATOR, AND ELECTRIC WATER HEATER

This application is a divisional of application Ser. No. 09/608,169 filed Jun. 30, 2000.

FIELD OF THE INVENTION

The present invention relates to a vacuum heat insulator, also referred to as a vacuum insulator, used as insulator for jar-pot, also referred to as electric thermo-pot, electric water heater, rice cooker, refrigerator, hot insulating device, heating device, cold insulating device, induction heater, heating cooker, heating-hot insulating device, etc.

BACKGROUND OF THE INVENTION

Conventional heat insulators include glass fiber, glass wool, foamed urethane, foamed styrene, and other plastic foams. Glass fiber has heat conductivity of about 0.035 kcal/mh° C. at 25° C. As better heat insulators than such fiber and foams, vacuum heat insulators are proposed. Glass fiber and foamed styrene generally have heat conductivity of about five times or higher as compared with vacuum heat insulator.

A conventional vacuum heat insulator comprises a laminate film bag having gas barrier performance, and an insulating core contained in this laminate bag, and the laminate bag is evacuated in a vacuum state. The laminate film bag with gas barrier performance has a laminated body of plastic film and gas barrier layer. As the gas barrier layer, an aluminum foil of about 6 to 10 μm in thickness, or aluminum deposition layer placed on the surface of a plastic film is used. As the plastic film, polyethylene terephthalate or polypropylene is used. As the insulating core, fine powder of silica, urethane foam or the like is used. The gas barrier layer in the vacuum heat insulator has a function of preventing fresh air from invading into the laminate film bag by penetrating through the laminate film bag.

Such conventional vacuum heat insulator is used in heat insulator of low temperature atmosphere in refrigerator or cold box.

An example of laminate film used in a conventional vacuum heat insulator is shown in FIG. 6. In FIG. 6, a laminate film 5 has a protective layer 1, gas barrier layer, and a heat fusion layer 4. The gas barrier layer includes a base material 3, and a deposition layer, also referred to as a vacuum evaporated layer, 2 evaporated on the surface of the base material 3. A protective layer 1 is formed as the outermost layer. The heat fusion layer 4 functions to seal the laminate film in a bag form by heat fusion. As the protective layer 1, a plastic film of 15 μm thick polyamide-6 (tradename 6-Nylon) is used. The glass transition point of 6-Nylon is 50° C. As the heat fusion layer 4, a plastic film of polypropylene of 50 μm in thickness is used. As the deposition layer 2, aluminum is used. The deposition film thickness of the deposition layer is about 50 nm. As the support layer 3, polyethylene terephthalate (PET) or polypropylene of about 25 μm in thickness is used.

The conventional vacuum heat insulator having such deposition layer cannot be used at high temperature.

For example, if the vacuum heat insulator is used at high temperature exceeding 90° C., the plastic film supporting the deposition layer expands or shrinks thermally, and the deposition layer is cracked due to difference in coefficient of expansion between the plastic film and deposition material. Through this crack, the air invades into the vacuum heat insulator, and the internal pressure of the vacuum heat insulator rises. As a result, the insulating performance of the vacuum heat insulator drops. Thus, in the conventional vacuum heat insulator, when thermal stress is applied, the insulating performance of the vacuum heat insulator deteriorates.

As the gas molecule becomes higher in temperature, its kinetic energy increases in geometric series. Accordingly, at high temperature near 100° C. the thin deposition layer deteriorates due to this kinetic energy, and lowers in function of suppressing penetration of gas. As a result, the vacuum inside the vacuum heat insulator cannot be maintained, and the insulating performance of the vacuum heat insulator declines.

In the vacuum heat insulator using deposition layer such as aluminum deposition as gas barrier layer, as the protective layer adhered to the deposition base material or deposition surface side, polyethylene terephthalate (PET) is used. This PET film is poor in thermal dimensional stability, and since the deposition layer is very thin, the deposition layer is broken by thermal shrinkage or contraction of the PET. As a result, the gas barrier performance of the vacuum heat insulator is lowered, and the vacuum cannot be maintained in the vacuum heat insulator, thereby worsening the insulating performance.

On the other hand, in the conventional vacuum heat insulator having an aluminum foil, heat conduction propagating through the aluminum foil is great. Accordingly, the heat quantity conducting in the creeping direction of the vacuum heat insulator is greater than the heat quantity conducting in the sectional direction of the vacuum heat insulator. Therefore, in the composition of the aluminum foil formed on one side of the vacuum heat insulator contacting mutually with the aluminum foil formed on other side, or in the composition shorter in the mutual distance, the heat conducts from one side to the aluminum foil, and does not conduct to other side. That is, the heat does not conduct through the insulating core filling up the inside of the laminate film bag. As a result, the vacuum heat insulator may not exhibit sufficient insulating performance.

The conventional vacuum heat insulator having the aluminum foil cannot be used as the heat insulator for induction heating cooker, induction heating type rice cooker, or other induction heating device. That is, the aluminum foil itself is heated by induction heating, and the vacuum heat insulator having the aluminum foil does not function as heat insulator.

As a conventional hot insulating device, a thermos bottle is known. A conventional thermos bottle has double glass or stainless steel structure, with the intermediate space evacuated to vacuum. That is, the conventional thermos bottle is a vacuum double container. Hot water or cold water is put in this vacuum double container, and is kept warm or cool. A warming cooker is proposed by installing an inner container for heating in an outer container having a vacuum double structure. The food is put in the inner container, and the food is cooked by cooking range or the like, and when the food is heated to specified temperature, the inner container containing the food is transferred into the outer container, and is used in insulated state.

However, the vacuum double container requires a rigid container withstanding vacuum at atmospheric pressure. Accordingly, the thermos bottle having the vacuum double container is very heavy, and it is inconvenient when used as portable tool such as water bottle. Or, a thermos bottle using vacuum double container of stainless steel material cannot be heated from outside of the vacuum double container. Water is heated by other means, and the heated water is transferred into the vacuum double container. It is troublesome. The glass vacuum double container can transmit magnetic field for induction heating, and induction heating is applicable, but the glass is very fragile and easily broken. Other insulators such as glass fiber and plastic foamed material is lower in the insulating performance than the vacuum double container, and the temperature of the contained hot water drops easily.

A conventional electric water heater consists of container and heater. The electric water heat with insulating function includes a container, a heater, and an insulator placed around the container. Water is put in the container, and the heat is connected to the power source, and the water boils. The electric water heater having an insulating function has a function of keeping the hot water nearly at a specific temperature for a long time. The insulator used in the electric water heater having the insulating function includes glass wool, other inorganic insulator, or reflective type insulator making use of a metal reflector.

However, the glass wool and similar insulators are excellent in thermal durability, but are low in insulating performance. Accordingly, the conventional electric water heater using glass wool or similar insulator requires a large electric power for heat insulating purpose.

SUMMARY OF THE INVENTION

A vacuum heat insulator of the invention comprises a laminate bag, and an insulating core placed in the laminate bag. The inside of the laminate bag is evacuated in a vacuum state. The laminate bag is made of a laminate film. The laminate film includes a support layer, a deposition layer evaporated on the surface of the support layer, a protective layer placed at the surface side of the deposition layer, and a seal layer placed at the back side of the deposition layer, and the deposition layer is formed of at least one material of metal and metal oxide.

The laminate film has at least one feature selected from the group consisting of:

(i) the support layer has a plastic film having a glass transition point of 87° C. or higher, (ii) the protective layer has a plastic film having a glass transition point of 87° C. or higher, (iii) the deposition layer has a property of transmitting high frequency magnetic field, and (iv) the laminate bag has a seal portion formed by junction of the seal layer, and the laminate film further as a metal foil placed at a position excluding the seal portion.

In this constitution, an excellent heat insulating performance is obtained even at high temperature, and this excellent heat insulating performance is maintained for a long period. Further, by turning on and off the high temperature device using the vacuum heat insulator. if thermal stress is applied to the vacuum heat insulator, the insulating performance of the vacuum heat insulator does not deteriorate, and an excellent insulating performance is maintained.

The hot insulating device of the invention comprises a container for accommodating the filling object, and the vacuum heat insulator disposed outside of the container. In this constitution, a hot insulating device having an excellent insulating performance is obtained.

The electric water heater of the invention comprises a container for holding liquid, a heater for heating the liquid, and the vacuum heat insulator disposed outside of the container. In this constitution, the power consumption for insulation is saved substantially.

BRIEF DESCRIPTION OF THE DRAWINGS

FIG. 5E is a plan of the vacuum heat insulator used in the electric water heater in the embodiment of the invention.

REFERENCE NUMERALS

Figure 1A:
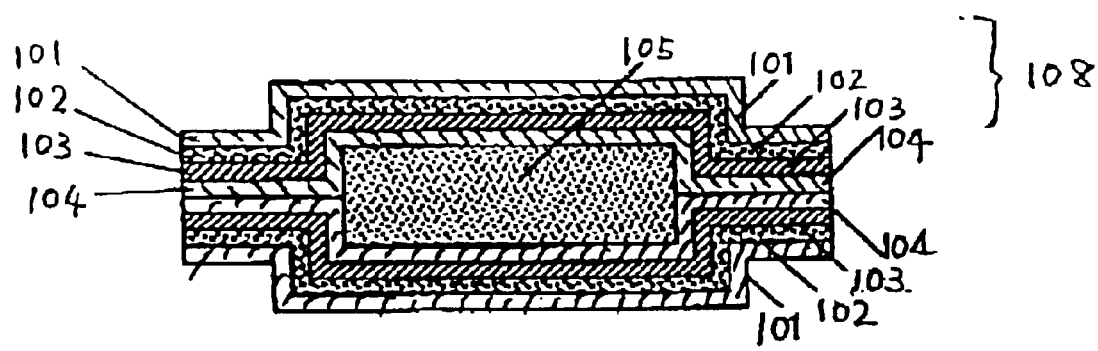
FIG. 1A is a sectional view showing a structure of a vacuum heat insulator in a first embodiment of the invention.

101 Protective layer
102 Deposition layer
103 Support layer, base material layer
104 Heat fusion layer
105 Insulating core
108 Laminate bag
109 Laminate bag
201 Core
202 Laminate film
203 Seal portion
204 Seal layer, heat fusion layer
205 Gas barrier layer
205a First gas barrier layer
205b Second gas barrier layer
206 Aluminum foil
207 Protective layer
209 Adhesive layer
211 Support layer
211a First support layer, PEN film
211b Second support layer, PEN film
212a Aluminum deposition layer
212b Aluminum deposition layer
303 Laminate film
304 Seal layer
305 Gas barrier layer
306 Protective layer
308 Induction heating device
310 Vacuum heat insulator
401 Container
402, 404 Vacuum heat insulator
406 Laminate film
409 Core
410, 423 Protective layer
411, 424, 425 Gas barrier layer
413, 427 Protective layer
502 Water storage container
513 Heater
520 Vacuum heat insulator
522 Core
525 Seal layer, heat fusion layer
526 Core
527 Gas barrier layer
529 Aluminum foil

DETAILED DESCRIPTION OF THE INVENTION

Exemplary embodiments of the invention are described below.

Exemplary Embodiment 1

In a vacuum heat insulator in an embodiment of the invention, a plastic film having a glass transition point of 87° C. or higher is used as a support layer for supporting a deposition layer evaporating metal or metal oxide. The deposition layer and support layer form the gas barrier layer. Or the deposition layer forms the gas barrier layer. In this composition, even at high temperature, cracking of the deposition layer is prevented. As a result, change of degree of vacuum inside the vacuum heat insulator in high temperature atmosphere is prevented, and an excellent insulating performance is maintained for a long period.

A vacuum heat insulator in other embodiment of the invention has a laminate film laminating a support layer supporting one side of deposition layer evaporating metal or metal oxide, and a protective layer protecting other side of the deposition layer. As the protective layer, a plastic film having a glass transition point of 87° C. or higher is used. In this composition, even at high temperature, cracking of the deposition layer is prevented. As a result, a vacuum heat insulator having an excellent insulating performance is obtained.

A vacuum heat insulator in other embodiment of the invention has a laminate film laminating a support layer supporting one side of deposition layer evaporating metal or metal oxide, and a protective layer protecting other side of the deposition layer. As the support layer, a plastic film having a glass transition point of 87° C. or higher is used. In this composition, even at high temperature, cracking of the deposition layer is prevented. As a result, a vacuum heat insulator having an excellent insulating performance is obtained.

A vacuum heat insulator in other embodiment of the invention has a laminate film laminating a first deposition layer evaporating metal or metal oxide, and a second deposition layer evaporating metal or metal oxide. The surface of the first deposition layer and the surface of the second deposition layer are adhered to each other. This laminate film forms a bag, which is filled with an insulating core, and its opening is sealed. The inside of the bag is evacuated to vacuum. In this composition, even at high temperature, cracking of the deposition layer is prevented. As a result, a vacuum heat insulator having an excellent insulating performance is obtained.

Preferably, as the plastic film, polyphenylene sulfide is used. This polyphenylene sulfide has a high glass transition point. Hence, further excellent effects are obtained.

Preferably, as the plastic film, polyethylene naphthalate, polycarbonate, or polyimide is used. These plastic films have a high glass transition point. Hence, extremely excellent effects are obtained.

Embodiment 1a

An embodiment of the invention is described below.

FIG. 1A is a sectional view showing a composition of the embodiment. The vacuum heat insulator of the invention has a laminate bag 108, and an insulating core 105 filling up this laminate bag 108. As the core 105, silica powder is used. The laminate bag 108 includes a support layer 103, a deposition layer 102 evaporated on the upper surface of the support layer 103, a protective layer 101 protecting the upper surface of the deposition layer 2, and a heat fusion layer 104. The laminate bag 108 is formed of a laminate film laminating these layers. The deposition layer 102 is formed by evaporating metal or metal oxide.

As the protective layer 101, a plastic film of 6-Nylon of 15 $\mu$m in thickness is used. The glass transition point of 6-Nylon is 50° C. As the heat fusion layer 104, a plastic film of polypropylene of 50 $\mu$m in thickness is used. As the deposition layer 102, aluminum is used. The deposition film thickness of the deposition layer is about 50 nm. As the support layer 103, polyphenylene sulfide of 25 $\mu$m in thickness, or polyethylene naphthalate of 25 $\mu$m in thickness is used. The glass transition point of polyphenylene sulfide resin is 87° C., and the glass transition point of polyethylene naphthalate is 121° C. The insulating core 105 is formed in a thickness of about 10 mm in completed state. The inside of the laminate bag 108 is evaluated to a vacuum of about 20 Torr (mmHg) or less, that is, an atmospheric pressure of about 20 Torr or less.

The operation of the embodiment is explained. The vacuum heat insulator of the embodiment is used as heat insulator for heating cooker or heating-hot insulating device. The vacuum heat insulator of the invention has a vacuum layer of about 10 mm in thickness by the actin as the core of the insulating core 107. This vacuum heat insulator has a thermal conductivity of about 0.006 kcal/mh° C. (about 0.007W/m-K). In this composition, the molecules of air transmitting heat from the high temperature side to the low temperature side is extremely small. As the insulating core 105, silica powder is used. The silica powder has a thermal conductivity of about 10 W/m-K at 25° C. and atmospheric pressure 760 Torr (mmHg). Therefore, the thermal conductivity at atmospheric pressure is smaller than that of glass fiber. Hence, if the degree of vacuum drops in the laminate bag, the degree of decline of insulating performance is small. Therefore, the heat insulation is maintained for a long period. As a result, the vacuum heat insulator can be used for a long period.

In the conventional vacuum heat insulator using polyethylene terephthalate or other plastic film, when the vacuum heat insulator is used at temperature of about 85° C., the support layer 105 supporting the deposition layer 102 expands or shrinks thermally. As a result, due to difference in coefficient of thermal expansion between the support layer 105 and deposition layer 102, crack is formed in the deposition material forming the deposition layer 102. In the embodiment, by contrast, as the support layer 103 for supporting the deposition layer 102, polyphenylene sulfide with glass transition point of 87° C., or the polyethylene naphthalate with glass transition point of 121° C. is used. Accordingly, when used at high temperature of about 85° C. the degree of thermal expansion or shrinkage of the support layer 103 is very small. Therefore, cracking of the deposition layer 102 is prevented. As a result, the deposition material forming the deposition layer 2 maintains the role of preventing change of degree of vacuum as the barrier layer. Hence, the vacuum heat insulator of the embodiment can maintain the excellent heat insulating performance for a long period as a heat insulator of the device having high temperature.

In the foregoing explanation, as the support layer 105, polyphenylene sulfide or polyethylene naphthalate is used, but other plastic resins as listed in Table 1 may be also used

TABLE 1

Plastic resin with glass transition point of 87° C. or higher

| Plastic resin | Glass transition point (° C.) |
|---|---|
| Polystyrene | 87 |
| Polyphenylene sulfide | 87 |
| Denatured polyphenylene ether | 100~220 |
| Cellulose triacetate | 107 |
| Polyethylene naphthalate | 121 |
| Polytetrafluoroethylene | 127 |
| Polyether ether ketone | 143 |
| Polyallyl ether nitrile | 145 |
| Polycarbonate | 150 |
| Polysulfone | 190 |
| Polyarylate | 193 |
| Polyether imide | 217 |
| Polyether sulfone | 225 |
| Polyimide | 250~500 |
| Polyamide imide | 280~290 |
| Polybenzolmidazole | 421 |

Embodiment 1b

Figure 1B:
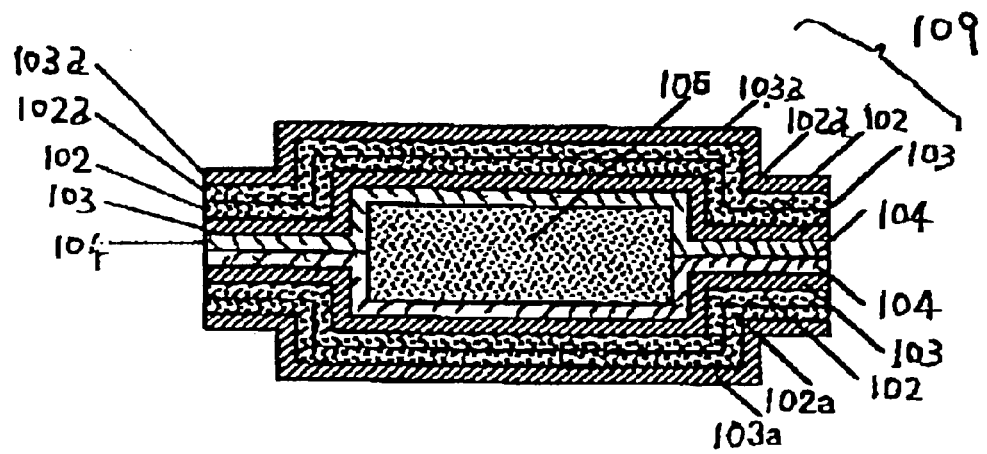
FIG. 1B is a sectional view showing a structure of a vacuum heat insulator in other embodiment of the invention.

Other embodiment of the invention is described. FIG. 1B is a sectional view showing a structure of a vacuum heat insulator of the other embodiment of the invention.

In FIG. 1B, the vacuum heat insulator of the invention comprises a first support layer 103, a first deposition layer 102 evaporated to this first support layer 103, a second support layer 103a, and a second deposition layer 102a evaporated to this second support layer 103a. The surface of the first deposition layer 102 and the surface of the second deposition layer 102a are adhered to each other. By thus stacked laminate film, a laminate bag 109 is formed. The first deposition layer 102 is disposed by vapor deposition of metal or metal oxide. The second deposition layer 102a is disposed by vapor deposition of same metal or metal oxide as the first deposition layer 102. The second support layer 103 has two functions, that is, function as the base material of the second deposition layer 102a and function as protective layer. The composition of the seal layer 104, support layer 103, and insulating core 105 is same as the composition explained in embodiment 1a.

In this embodiment, the laminate bag 109 has two deposition layers, that is, first deposition layer 102 and second deposition layer 102a. Accordingly, both first support layer 103 for supporting the first deposition layer 102 and second support layer 103a for supporting the second deposition layer 102a also have the function as protective layer for protecting the two deposition layers 102, 102a. Therefore, when the first support layer 103 and second support layer 103a are made of plastic film having glass transition point of 87° C. or higher, excellent effects equivalent to or superior to those of embodiment 1a are obtained. That is, generation of stress is more effectively prevented. Therefore, if the vacuum heat insulator of the embodiment is used at high temperature, cracking of the deposition layers 102, 102a is prevented. As a result, the deposition material forming the deposition layers 102, 102a maintains the role of preventing change of degree of vacuum as barrier layer. Hence, the vacuum heat insulator of the embodiment can maintain an excellent heat insulating performance for a long period as the insulator for devices having high temperature. Moreover, since two support layers having deposition layers are disposed, better effects than in embodiment 1a are obtained.

Embodiment 1c

An experiment was conducted to verify the effects of embodiment 1a and embodiment 1b. Results of the experiment are explained.

Samples of vacuum heat insulator used in the experiment were prepared in the following procedure.

Test sample 1 has the structure of embodiment 1a (structure in FIG. 1A). That is, three sides of the laminate film shown in FIG. 1A are heated and fused with the seal layer 104 overlapped inside. Thus, a rectangular laminate bag 108 of 200 mm in length and 300 mm in width is prepared.

This laminate bag 108 is filled with silica powder as insulating core 105. In this state, the inside of the laminate bag 108 is evacuated to about 0.5 Torr. Finally, the remaining opening of the laminate bag 108 is heated and fused. As a result, test sample 1 of vacuum heat insulator in 10 mm in thickness is obtained.

Test sample 2 has the structure of embodiment 1b (structure in FIG. 1B). That is, three sides of the laminate film shown in FIG. 1B are heated and fused with the heat fusion layer 104 overlapped inside. Thus, a rectangular laminate bag 109 of 200 mm in length and 300 mm in width is prepared.

This laminate bag 109 is filled with silica powder as insulating core 105. In this state, the inside of the laminate bag 109 is evacuated to about 0.5 Torr. Finally, the remaining opening of the laminate bag 109 is heated and fused. As a result, test sample 2 of vacuum heat insulator in 10 mm in thickness is obtained.

Figure 6:
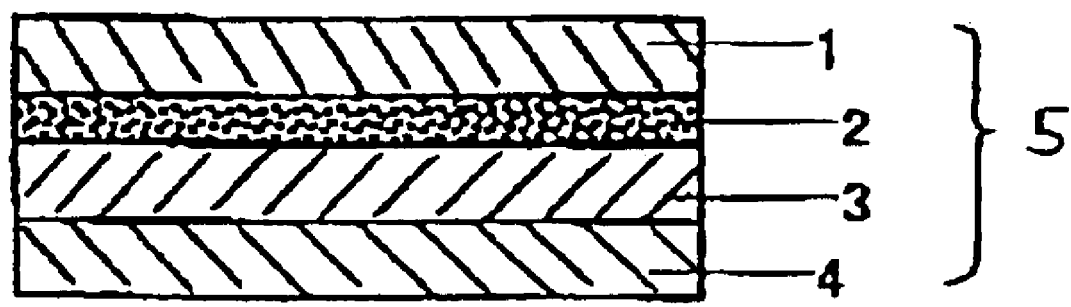

Test sample 3 has the structure of the prior art shown in FIG. 6. That is, the support layer 3 is polyethylene terephthalate (PET) of about 25 μm in thickness. The protective layer 1 is 6-Nylon. Other composition of test sample 3 is same as the composition of test sample 1.

Thus prepared test sample 1, test sample 2 and test sample 3 were measured in the following steps.

Measurement 1: Right after preparation, the internal pressure of the vacuum heat insulator was measured.

Measurement 2: After letting stand in the atmosphere of 85° C. for 3 days, the internal pressure of the vacuum heat insulator was measured.

Measurement 3: After letting stand in the atmosphere of 85° C. for 10 days, the internal pressure of the vacuum heat insulator was measured.

Measurement 4: After letting stand in the atmosphere of 100° C. for 3 days, the internal pressure of the vacuum heat insulator was measured.

Measurement 5: After letting stand in the atmosphere of 100° C. for 10 days, the internal pressure of the vacuum heat insulator was measured.

The internal pressure of the vacuum heat insulator was measured in the following procedure. The test sample was put in a chamber, and the chamber was evacuated until the sample was deformed, and the pressure at this time was measured. That is, the moment when the degree of vacuum in the chamber exceeds the degree of vacuum of the test sample, the test sample is pulled outside due to difference in pressure between inside and outside of the vacuum heat insulator, and the vacuum heat insulator is deformed. The pressure (the degree of vacuum in Torr) when the test sample was deformed was measured.

Results of measurement are summarized in Table 2. Table 2 teaches the following.

(1) In samples B, D, E using polyethylene naphthalate resin of which glass transition point is 121° C. as support layer 103 or protective layer 101, excellent gas barrier performance and degree of vacuum are maintained even after high temperature durability test at both 85° C. and 100° C.

(2) In samples A, C using polyphenylene sulfide resin of which glass transition point is 87° C. as support layer 103 or protective layer 101, excellent gas barrier performance and degree of vacuum are maintained even after high temperature durability test at 85° C.

(3) In sample E using polyphenylene sulfide resin of which glass transition point is 87° C. as both support layer 103 and protective layer 101, excellent gas barrier performance and degree of vacuum are maintained even after high temperature durability test at 100° C.

(4) In samples G, H having two deposition layers, and a plastic film having glass transition point of 87° C. or higher disposed at both sides of the deposition layers, further excellent gas barrier performance and degree of vacuum are maintained.

TABLE 2

| Sample No. | Sample | Initial | 85° C. | 100° C. |
|---|---|---|---|---|
| 1 | A | 1 | 2/2 | 9/20 or more |
|  | B | 1 | 1/1 | 2/2 |
|  | C | 1 | 1/2 | 10/20 or more |
|  | D | 1 | 1/2 | 2/2 |
|  | E | 1 | 1/1 | 5/13 |
|  | F | 1 | 1/1 | 1/2 |

TABLE 2-continued

| Sample No. | Sample | Initial | 85° C. | 100° C. |
|---|---|---|---|---|
| 2 | G | 1 | 1/1 | 2/4 |
|  | H | 1 | 1/1 | 1/2 |
| 3 | Comparative example | 1 | 4/15 | 20 or more/20 or more |

Note 1.
Samples
A: Polyphenylene sulfide resin used as support layer
B: Polyethylene naphthalate resin used as support layer
C: Polyphenylene sulfide resin used as protective layer
D: Polyethylene naphthalate resin used as protective layer
E: Polyphenylene sulfide resin used as protective layer
F: Polyethylene naphthalate resin used as support layer and protective layer
G: Polyphenylene sulfide resin used two support layers
H: Polyethylene naphthalate resin used as two support layers
Note 2.
Unit of degree of vacuum: Torr
Note 3.
Indication of measurement result at 85° C. and 100° C. 3 days/10 days As explained above, by the constitution of the invention, if used at high temperature, the degree of thermal expansion or thermal shrinkage of the support layer is very small. Hence, cracking of deposition layer is prevented. As a result, the deposition material forming the deposition layer 2 maintains the role of preventing change of degree of vacuum as barrier layer. As a result, the vacuum heat insulator of the invention maintains an excellent insulating performance for a long period as the insulator for device having high temperature.

Exemplary Embodiment 2

A vacuum heat insulator in other exemplary embodiment of the invention comprises a laminate bag, an insulating core put in the laminate bag, and an aluminum foil. The aluminum foil is placed between the laminate film and insulating core, or disposed in the laminate film. The inside of the laminate bag is evacuated to vacuum. The insulating core is disposed in the laminate bag in sealed state. The laminate bag is formed of a support layer having an aluminum deposition layer, and a laminate film having a seal layer. At least one side of the laminate bag has a heat seal portion. The aluminum foil is disposed in a region excluding the heat seal portion. In this constitution, a vacuum heat insulator having an excellent insulating performance at high temperature is obtained.

Preferably, the support layer has polyethylene naphthalate. In this composition, a vacuum heat insulator capable of insulating for a long time even in high temperature atmosphere is obtained.

Preferably, the laminate film has a first support layer, a first aluminum deposition layer evaporated to the first support layer, a second support layer, and a second aluminum deposition layer evaporated to the second support layer, and the first aluminum deposition layer and second aluminum deposition layer are laminated in mutually facing state.

In this constitution, invasion of gas into the laminate bag is prevented, and the gas barrier performance is enhanced extremely. Further, a vacuum heat insulator capable of insulating for a long time even in high temperature atmosphere is obtained.

Preferably, the aluminum foil is adhered to the laminate film. This aluminum foil, after being adhered to the laminate film, is formed into a specified shape by etching. In this constitution, the aluminum foil of a fine shape can be disposed accurately. As a result, a vacuum heat insulator of high performance is obtained.

Preferably, the aluminum foil is laminated on the laminate film. In this constitution, processing is easy, and a vacuum heat insulator of high performance is obtained.

Preferably, the aluminum foil is disposed between the support layer having an aluminum deposition layer and the seal layer. In this constitution, a vacuum heat insulator having an excellent durability and excellent insulating performance is obtained.

Preferably, the aluminum foil is disposed between the first aluminum deposition layer and second aluminum deposition layer. In this constitution, a vacuum heat insulator having an excellent durability and excellent insulating performance is obtained.

Preferably, the support layer having the aluminum deposition layer is disposed between the aluminum foil and the seal layer. In this constitution, a vacuum heat insulator having an excellent durability and excellent insulating performance is obtained.

Embodiment 2a

Figure 2A:
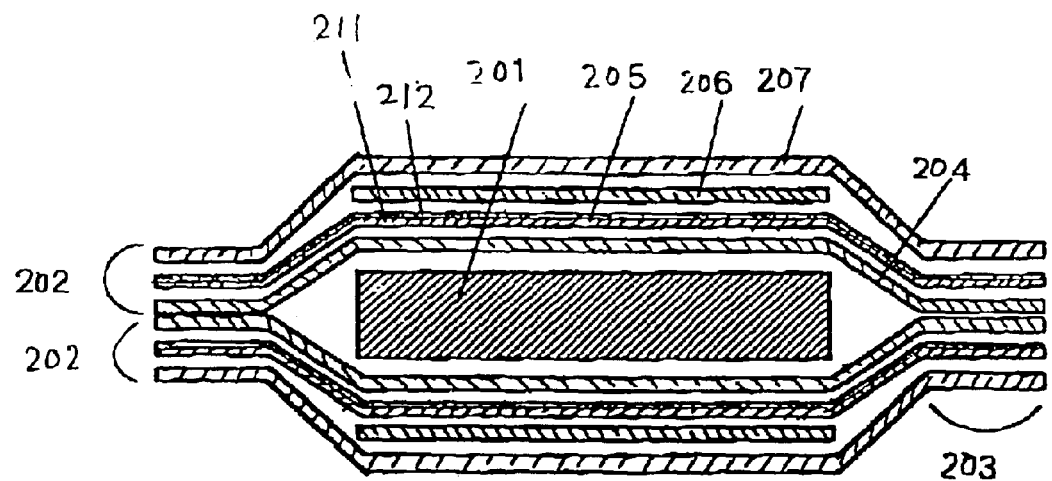
FIG. 2A is a sectional view showing a structure of a vacuum heat insulator in a second embodiment of the invention.
Figure 2B:
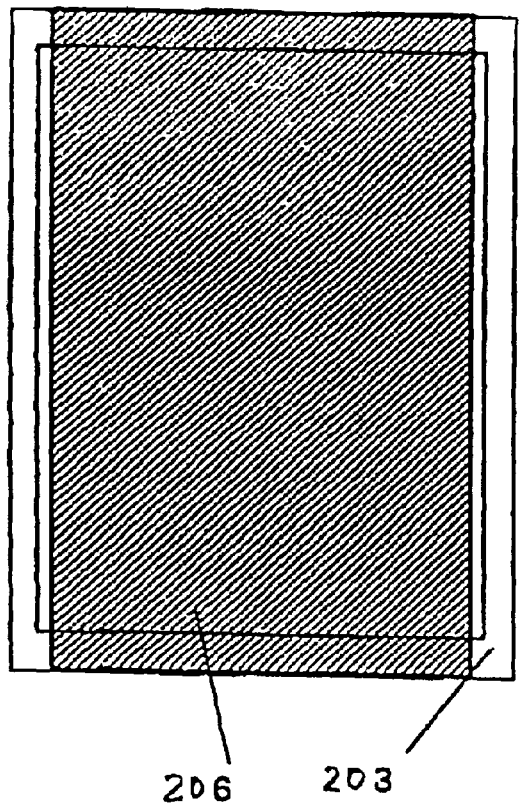
FIG. 2B is a plan of a laminate film for explaining the shape of aluminum foil used in the vacuum heat insulator in FIG. 2A.

A specific embodiment of the invention is explained below. FIG. 2A is a sectional view showing a structure of vacuum heat insulator of the embodiment. FIG. 2B is a plan showing a structure of the embodiment. In the vacuum heat insulator of the embodiment, a laminate bag is formed of two laminate films 202. An insulating core 201 is put in the laminate bag. That is, the insulating core 201 is covered with two laminate films 202. The inside of the laminate bag is evacuated to vacuum, and a seal portion 203 is sealed. The material of the core 201 is inorganic matter such as silica powder, pearlite or glass wool, or organic matter such as melamine or urethane. In this embodiment, power of synthetic silica is used. The laminate film 202 has a polyethylene naphthalate film (PEN film) as protective layer 207, a polypropylene film as seal layer 204, a PEN film as support layer 211, and an aluminum deposition layer 212 evaporated to this support layer 211. The support layer 211 and aluminum deposition layer 212 form a gas barrier layer 205. Between this gas barrier layer 205 and protective layer 207, an aluminum foil 206 is laminated. The thickness of the aluminum foil 206 is about 6 $\mu$m. As shown in FIG. 2B, this aluminum foil 206 is disposed in a region of the laminate film 202 excluding at least a part of the seal portion 203. That is, the aluminum foil 206 is disposed so as not to contact with the seal portion 203. As the seal layer 204, an undrawn polypropylene of 50 $\mu$m in thickness is used. The thickness of the aluminum deposition layer 215 is about 50 nm. As the protective layer 207, a PEN film of 12 $\mu$m in thickness is used.

The action of the embodiment is explained. When the vacuum heat insulator of the embodiment is assembled in a heating-hot insulating device such as jar-pot, a temperature difference occurs at both sides of this vacuum heat insulator. That is, one side of the vacuum heat insulator is contacting with boiling water, and its temperature is nearly 100° C. The other side of the vacuum heat insulator is contacting with the outer wall of the jar-pot, and its temperature is room temperature. In this state, the heat quantity of the boiling water is transmitted to the outside of the jar-pot through the vacuum heat insulator. In this state, there is heat conduction in both sectional direction and creeping direction of the vacuum heat insulator. This heat transfer quantity is proportional to the product of the thermal conductivity and thickness of the vacuum heat insulator. In the composition of this embodiment, the product of the thermal conductivity and thickness is 0.01 [{W/(m·K)}·m] in the seal layer 204, 1.4 [{W/(m·K)}·m] in the aluminum foil 206, 0.012 [{W/(m·K)}·m] in the aluminum deposition layer 205, and 0.003 [{W/(m·K)}·m] in the protective layer 207. That is, the aluminum foil 206 has the thermal conductivity of about 50 times of the total of the other parts.

As a result, when the vacuum heat insulator of the embodiment is used, the thermal conductivity in the creeping direction of the vacuum heat insulator is extremely small. That is, since the aluminum foil 206 is not present in the seal portion 203, the heat quantity of moving the seal portion 203 free from aluminum foil 206 is about 1/50 of the central part having the aluminum foil 206. Therefore, as mentioned above, the heat conduction from the creeping direction of the vacuum heat insulator of the embodiment is very small. Moreover, since the insulating core 201 evacuated to vacuum is present in the sectional direction of the vacuum heat insulator of the embodiment, the heat conduction in the sectional direction is extremely small. As a result, a vacuum heat insulator having an extremely excellent insulating performance is obtained.

For example, by turning on and off the power source of the device using the vacuum heat insulator, the vacuum heat insulator is exposed to temperature stress all the time. The vacuum heat insulator of the embodiment also has an excellent resistance to such temperature stress. That is, as the support layer 211 for forming the aluminum deposition layer 212, a PEN film is used. The PEN film 211 has a high melting point and a high glass transition point, and also has an excellent dimensional stability against temperature changes. Accordingly, when the vacuum heat insulator is exposed to thermal stress, the difference is small between the shape change due to expansion and shrinkage of the aluminum deposition layer 212 and the shape change due to expansion and shrinkage of the PEN film itself. Hence, if exposed to thermal stress, stress on the aluminum deposition layer 212 hardly occurs. That is, even in high temperature atmosphere, formation of pin hole in the aluminum deposition layer 212 is prevented. As a result, the laminate film 202 having the aluminum deposition layer 215 acts as a gas barrier layer of long life and high reliability.

Thus, according to the constitution of the embodiment, a vacuum heat insulator having an excellent insulating performance even in high-temperature use is obtained.

Incidentally, when the laminate film 202 has a support layer of polyethylene naphthalate, the melting point and glass transition point of the support layer are high, and the support layer has an excellent dimensional stability against temperature changes, and therefore if used in high temperature atmosphere, formation of pin hole in the aluminum deposition layer 212 is prevented, so that a vacuum heat insulator having an excellent insulating performance even in high-temperature use is obtained.

The aluminum foil 206 is formed by etching. That is, after the aluminum foil 206 is entirely adhered to the inside of the protective layer 207, a specified area of the aluminum foil is melted and removed by etching as shown in FIG. 2B. An alkaline solution is used as the etchant. Since etching is a fine process, an aluminum foil of a desired shape can be formed accurately. Therefore, a vacuum heat insulator of high performance is obtained.

Embodiment 2b

Figure 2C:
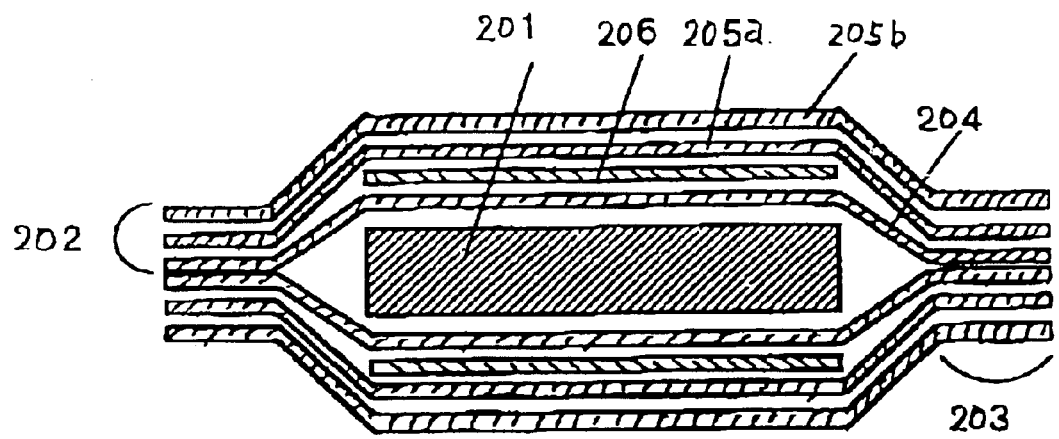
FIG. 2C is a sectional view showing a structure of a vacuum heat insulator in other embodiment of the invention.

FIG. 2C is a sectional view showing a vacuum heat insulator in other embodiment of the invention. In FIG. 2C, a laminate film 202 has a first gas barrier layer 205a and a second gas barrier layer 205b. The first gas barrier layer 205a has a first PEN film 211a, and a first aluminum deposition layer 212a evaporated to the first PEN film 211a. The second gas barrier layer 205b has a second PEN film 211b, and a second aluminum deposition layer 212b evaporated to the second PEN film 211b. The first aluminum deposition layer 212a and second aluminum deposition layer 212b are adhered in mutually facing state. The aluminum foil 206 is laminated to the inside of the first PEN film 211a.

Figure 2D:
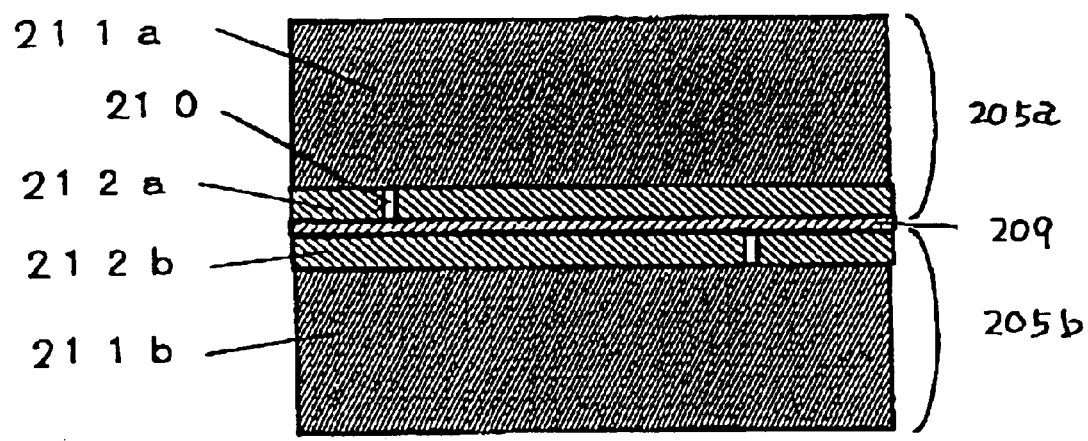
FIG. 2D is a sectional view explaining a structure of aluminum deposition layer.

A detailed sectional vies of the laminate film used in the embodiment is given in FIG. 2D. In FIG. 2D, the laminate film has the first gas barrier layer 205a and the second gas barrier layer 205b. The first gas barrier layer 205a has the first PEN film 221a as the first support layer 211a and the first aluminum deposition layer 212a. The second gas barrier layer 205 has the second PEN film 211b as the second support layer and the second aluminum deposition layer 212b. The first aluminum deposition layer 212a and second aluminum deposition layer 212b are mutually adhered with an adhesive 209. Each thickness of the first aluminum deposition layer 212a and second aluminum deposition layer 212b is about 50 nm. If the thickness of the aluminum deposition layer is small, generally, pin holes 210 are likely to occur, and the gas may pass through the pin holes to change the internal atmospheric pressure in the vacuum heat insulator, thereby lowering the insulating performance of the vacuum heat insulator. However, when the first deposition layer 212a and second deposition layer 212b are adhered to confront each other, the formed pin holes 210 are mutually plugged by the first PEN film 211a and second PEN film 211b. It hence prevents change of internal atmospheric pressure due to invasion of gas into the vacuum heat insulator. As a result, an excellent insulating performance is maintained for a long period.

At this time, as shown in FIG. 2C, the aluminum foil 206 is disposed between the first gas barrier layer 205a and seal layer 204. The thickness of the aluminum foil 206 is about 6 μm. Accordingly, when a thermal stress is applied, the laminate film 202 shrinks, and rubs against the core 201 or external part, and at this time the first gas barrier layer 205a and second gas barrier layer 205b act effectively to protect the vacuum heat insulator. Therefore, the vacuum heat insulator of the invention has both excellent durability and excellent insulating performance.

Embodiment 2c

Figure 2E:
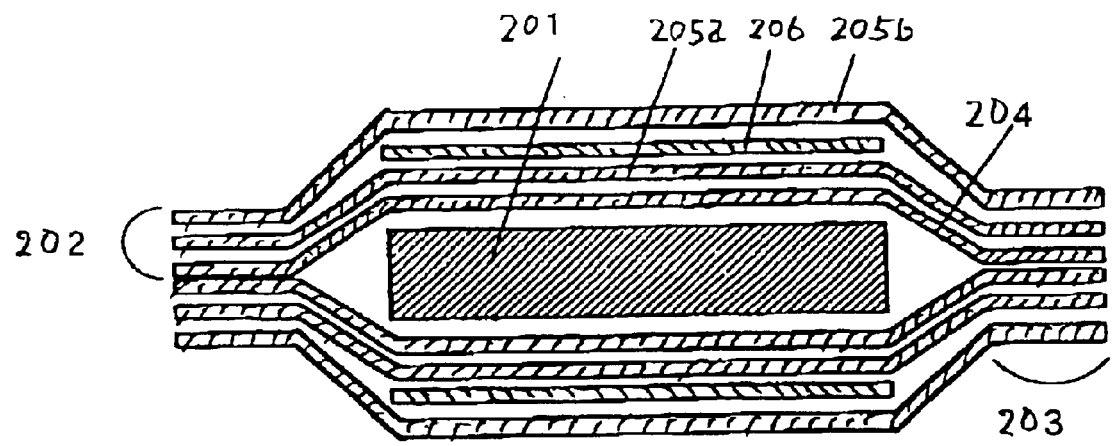
FIG. 2E is a sectional view showing a structure of a vacuum heat insulator in other embodiment.
Figure 2F:
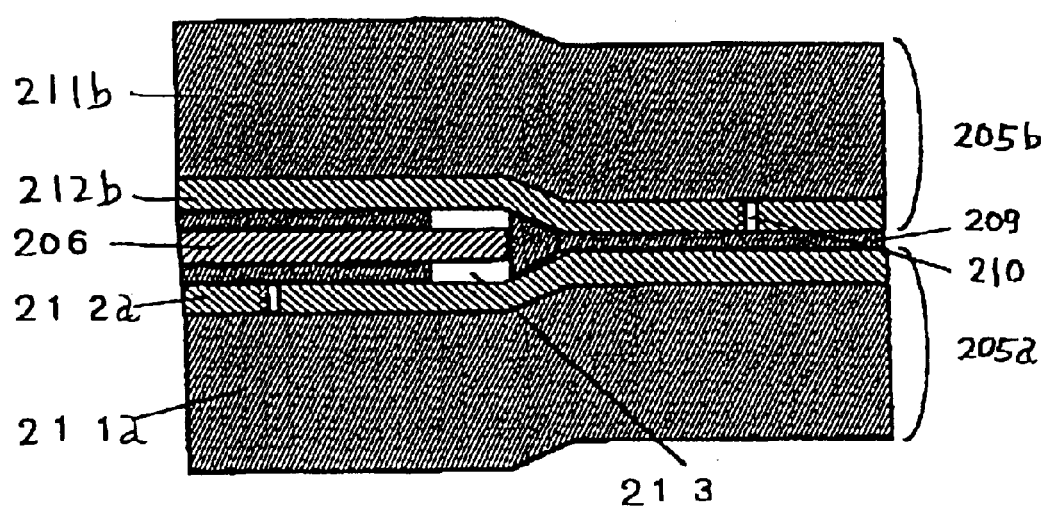
FIG. 2F is a sectional view showing a detailed structure of aluminum foil of the vacuum heat insulator shown in FIG. 2E.

FIG. 2E is a sectional view showing a structure of a further different embodiment of the invention. FIG. 2F is a sectional view showing a detailed structure. In this embodiment, an aluminum foil 206 is disposed between a first gas barrier layer 205a and a second gas barrier layer 205b, and they are adhered together tightly with an adhesive. The aluminum foil 206 is disposed in a region excluding a part of a seal portion 203. As a support layer 211, a PEN film is used. As shown in FIG. 2F, at this time, the adhesive is applied in a range narrower than the aluminum foil 206. Therefore, an adhesive-free space 213 is likely to be formed at the end of the aluminum foil 206. When such space 213 is formed, it is possible that air or gas may pass through the space 213 to invade into the laminate film. By contrast, in the vacuum heat insulator of the embodiment, since the aluminum foil 206 is disposed between the first gas barrier layer 205a and second gas barrier layer 205b, if space 213 is formed, invasion of air is blocked by the PEN films 211a, 211b having the first aluminum deposition layer 212a and second aluminum deposition layer 212b.

According to the embodiment, only by the processing of adhering the aluminum foil 206 to the PEN film the laminate film can be manufactured easily. Therefore processing is very easy. Further, a vacuum heat insulator having an excellent insulating performance is obtained. Still more, not requiring chemical processing such as etching, there is no risk of deterioration of resin, and a vacuum heat insulator usable for a long period is obtained.

Embodiment 2d

Figure 2G:
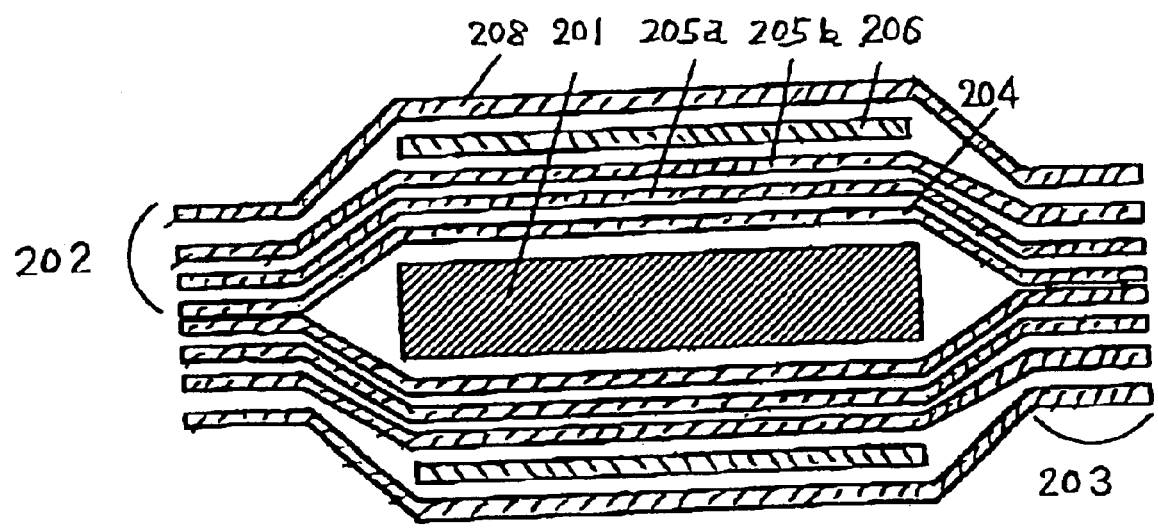
FIG. 2G is a sectional view showing a structure of a vacuum heat insulator in other embodiment of the invention.

FIG. 2G is a sectional view showing a structure of other different embodiment of the invention. In this embodiment, a first gas barrier layer 205a and a second gas barrier layer 205b are disposed between an aluminum foil 206 and a seal layer 204, and the outer surface of the aluminum foil 206 is covered with a protective layer 208. As the protective layer 208, polyamide (tradename Nylon) is used.

Accordingly, if a space 213 as explained in embodiment 2c is formed at the end of the aluminum foil 206, since there are two layers, first gas barrier layer 205a and second gas barrier layer 205b, invasion of gas through the space 213 is prevented. Therefore, according to the embodiment, a vacuum heat insulator having an excellent insulating performance usable for a long period is obtained.

As explained herein, the constitution of the embodiment presents a vacuum heat insulator having an excellent durability and excellent insulating performance usable for a long period even at high temperature.

Exemplary Embodiment 3

A vacuum heat insulator in a different exemplary embodiment of the invention comprises a laminate film bag and an insulating core disposed in the laminate bag. The inside of the laminate bag is evacuated to vacuum. The laminate bag is made of a laminate film. The laminate film has a gas barrier layer with gas barrier performance. The gas barrier layer has a ductile metal. The metal has a thermal conductivity of 100 W/m·K or less at 300K. In this constitution, a vacuum heat insulator having an excellent insulating performance not deteriorating for a long period is obtained.

A vacuum heat insulator in a further different exemplary embodiment of the invention comprises a laminate film bag and an insulating core disposed in the laminate bag. The inside of the laminate bag is evacuated to vacuum. The laminate bag is made of a laminate film. The laminate film has a gas barrier layer with gas barrier performance. The gas barrier layer has a property of passing through a high frequency magnetic field. In this constitution, by applying high frequency magnetic field in the cooking container, the cooking container is heated by induction, and an excellent insulating performance is obtained as the insulator for insulating the induction heating device for heating water or food.

Preferably, the metal has a metal foil. In this constitution, an excellent insulating performance is obtained for insulation of induction heating device.

Preferably, the metal foil is a stainless steel with a thickness of 50 μm or less. The stainless steel allows to pass high frequency magnetic field, and hence heating or burning of metal foil is prevented. Therefore, when vacuum heat insulator is used as the insulator of the induction heating cooker, lowering of induction heating efficiency of the induction heating device is prevented, and an excellent insulating performance is obtained at the same time. This vacuum heat insulator can be used for insulation of induction heating device.

Preferably, the metal is SUS430, SUS304, SUS301, SUS316, or a plurality of combinations thereof. This constitution realizes a vacuum heat insulator having excellent heat resistance, excellent durability and excellent insulating effect, and usable as insulator for insulation of induction heating device.

Preferably, the metal foil is a titanium foil with thickness of 50 $\mu$m or less. This constitution realizes a vacuum heat insulator having excellent heat resistance, excellent durability and excellent insulating effect, and usable as insulator for insulation of induction heating device.

Preferably, the laminate film has a protective layer, and this protective layer has one layer of heat resistant organic film or a plurality of layers of heat resistant organic film. In this constitution, deterioration of laminate film at high temperature is prevented. As a result, if used at high temperature, a vacuum heat insulator maintaining an excellent insulating performance for a long period is obtained.

Preferably, the heat resistant organic film has polyethylene terephthalate, polyethylene naphthalate, polyimide, or polyphenyl sulfide. In this constitution, deterioration of laminate film at high temperature is prevented. As a result, if used at high temperature, a vacuum heat insulator maintaining an excellent insulating performance for a long period is obtained.

Embodiment 3a

Figure 3A:
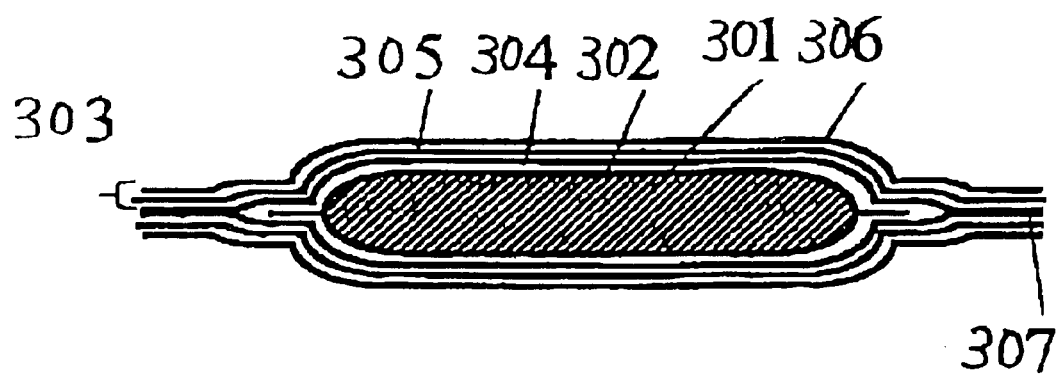
FIG. 3A is a sectional view showing a structure of a vacuum heat insulator in a third embodiment of the invention.

A specific embodiment of the invention is described below FIG. 3A shows a sectional view showing a structure of a vacuum heat insulator of the embodiment. The vacuum heat insulator of the embodiment comprises an inner bag 302, an insulating core 301 disposed in the inner bag 302, and a laminate film 303. The laminate film 303 is formed like a bag, and a laminate bag is formed. The insulating core 301 disposed in the inner bag 302 is placed in the laminate film 303 in bag form. The laminate film 303 has a heat fusion layer 304, a gas barrier layer 305, and a protective layer 306. The laminate film 303 has an adhesion portion 307. The laminate bag is sealed in an enclosed state by heating and fusing the adhesion portion 307. The inside of the laminate bag is evacuated to a vacuum state.

As the core 301, fine powder of silica or pearlite, or urethane foam or the like may be used. In this embodiment, the core 301 is synthetic silica powder of fine particle size. The synthetic silica powder having fine particles has a small thermal conductivity. This synthetic silica powder has a very small thermal conductivity, regardless of the pressure, at pressure of about 10 Torr or less. Accordingly, if used at high temperature where motion of air molecules is large, the vacuum heat insulator using synthetic silica powder exhibits an excellent heat insulating performance.

As the heat fusion layer 304, polyethylene, high density polyethylene, polyacrylonitrile, polypropylene, or the like may be used. In this embodiment, as the heat fusion layer 304, homopolymer of undrawn polypropylene having a high crystallinity is used. The undrawn polypropylene does not deteriorate if left over in the atmosphere of high temperature of about 100° C. for a long period.

The gas barrier layer 305 has a role of holding the vacuum inside the vacuum heat insulator. The degree of vacuum inside the vacuum heat insulator (that is, the internal pressure) is about 20 Torr or less. Generally, due to the mechanical external force such as thermal stress, the gas barrier effect of the gas barrier layer 305 is lowered, and the gas invades into the laminate bag, so that the internal pressure climbs up. As a result, the insulating performance of the vacuum heat insulator is lowered.

In this embodiment, the gas barrier layer 305 is a metal having ductility and thermal conductivity of 100 W/m·K or less at 300K. Since the metal is ductile, if the thin metal foil is fabricated by the process of spreading the metal thinly, formation of pin holes is prevented. Besides, since the thermal conductivity of the metal is small, heat conduction from the end of the laminate film having the metal can be prevented. As a result, the insulating performance of the vacuum heat insulator is enhanced.

The action of the embodiment is explained. The vacuum heat insulator shown in FIG. 3A exhibits an excellent heat insulating performance when used in the induction heater making use of induction heating. Of course, this vacuum heat insulator exhibits a superior insulating performance when used in refrigerator, cold box, or ordinary heating or hot insulating device.

As induction heating device, cooking tool, jar rice cooker, hot-plate, hot-pan, and other heating device heated by induction heating are proposed. In the induction heating device, high frequency magnetic field of about, for example. 25 kilohertz is generated from the high frequency coil, and this high frequency magnetic field is applied to the cooking container of the cooking device, and the cooking container is heated by induction. That is, by application of high frequency magnetic field, an eddy current is generated in the metal for composing the cooking container. By this eddy current, Joule heat is generated. By this induction heating, the food contained in the cooking container is cooked.

In such apparatus having a structure of heating the cooking container by the high frequency magnetic field, the vacuum heat insulator having the metal cannot exhibit its excellent insulating performance depending on the type of the metal. For example, the high frequency magnetic field generated by the apparatus when cooking is applied to the metal for composing the gas barrier layer of the insulator, this metal itself may be heated by induction heating. As a result, the gas barrier layer is broken. Hence, the vacuum heat insulator is destroyed.

The embodiment presents a vacuum heat insulator capable of avoiding such effects of the high frequency magnetic field.

The induction heating phenomenon occurring due to crossing with the high frequency magnetic field varies in its behavior depending on the type and thickness of the metal to be heated. The stainless steel, titanium, iron, chromium and carbon steel having a relatively large electric resistance are excessively heated by induction heating at the thickness in the micron order. When the thickness of these metals is in the micron order, these metals are hardly heated. In particular, in the stainless steel or titanium having a large electric resistance, these metals are hardly heated when the thickness is about 20 $\mu$m or less. When the thickness of these metals is about 5 $\mu$m or less, these metals are not heated practically. The metal of thickness in the micron order also has a property of passing the, high frequency magnetic field generated from the high frequency coil. The metal having a small electric resistance such as aluminum and copper is not heated by induction heating in the thickness range of micron order. However, when the metal thickness is in the order of about 7 $\mu$m, the metal is heavily heated. For example, in vapor deposition technique, sputtering technique, and etching technique, aluminum in thickness of about 0.05 to about 1 $\mu$m passes high frequency magnetic field and is not heated by induction.

That is, in this embodiment, as the gas barrier layer 305 shown in FIG. 3A, a ductile metal having thermal conductivity of 100 W/m·K at 300K is used. By using a ductile metal, it is easy to manufacture a thinly processed metal foil. It is therefore possible to process to the metal to a thickness not to be heated by induction when put in the magnetic field such as high frequency magnetic field. That is, a metal foil preventing formation of pin hole is formed. Further, when using a deposition layer evaporating metal to the support layer, deposition layer free from pin hole is formed. Thus, the gas barrier layer 305 capable of maintaining an excellent gas barrier characteristic is obtained. Further, by using a metal having a small thermal conductivity, a vacuum heat insulator having an extremely excellent insulating effect is obtained. The thermal conductivity at average temperature of 300K is 100 (W/m·K), and usable examples of ductile metal include iron (80 W/m·K), nickel (90 W/m·K), platinum (71 W/m·K), tin (73 W/m·K), titanium (20 W/m·K), stainless steel (15 W/m·K), and carbon steel (50 W/m·K).

In this embodiment, since the gas barrier 305 is made of a very thin material such as metal foil or deposition layer, the gas barrier layer 305 is likely to be damaged. If the gas barrier layer 305 is damaged, the internal vacuum of the film bag cannot be maintained, and the insulating performance of the vacuum heat insulator is lowered. In this embodiment, accordingly, a protective layer 306 is placed outside of the gas barrier layer 305. The protective layer 306 of the embodiment is polyethylene terephthalate (PET), polyethylene naphthalate (PEN), polyimide (PI), polyphenyl sulfide (PPS), or other heat resistant film. By using such heat resistant films, if the vacuum heat insulator is used at high temperature of about 100° C., thermal deterioration of protective layer is prevented. As a result, a vacuum heat insulator capable of maintaining an excellent insulating performance is obtained. As the protective layer 306, when using polyamide resins such as polyamide-6 (tradename Nylon 6) or polyamide 66 (tradename Nylon 66), these effects are slightly inferior because Nylon 6 and Nylon 66 tend to deteriorate thermally at high temperature.

Examples for verifying these effects of the embodiment are explained below.

Embodiment 3b

Using the laminate film having the following gas barrier layer 305, various vacuum heat insulators are prepared.

Prior art 1: Aluminum foil of 7 $\mu$m in thickness.

Prior art 2: Aluminum deposition layer of 0.05 $\mu$m in thickness evaporated on PET film.

SUS foil A of embodiment: Metal foil using SUS304 of 7 $\mu$m in thickness.

SUS foil B of embodiment: Metal foil using SUS304 of 50 $\mu$m in thickness.

Titanium foil A of embodiment: Titanium foil of 7 $\mu$m in thickness.

Titanium foil B of embodiment: Titanium foil of 50 $\mu$m in thickness.

Results of experiment are shown in Table 3.

TABLE 3

| Composition | Penetrating heat quantity (W) | Heat quantity transferring end face (W) | Total leak heat quantity (W) |
|---|---|---|---|
| Prior art 1 | 18.3 | 67.5 | 85.8 |
| Prior art 2 | 18.3 | 0.5 | 18.8 |
| SUS foil A | 18.3 | 4.3 | 22.6 |
| SUS foil B | 18.3 | 30.5 | 48.8 |
| Titanium foil A | 18.3 | 5.7 | 24.0 |
| Titanium foil B | 18.3 | 40.7 | 59.0 |

As clear from Table 3, the penetrating heat quantity is same in all vacuum heat insulators. However, a significant difference is noted in the heat quantity transferring the end face of the vacuum heat insulator. That is, the vacuum heat insulator using stainless steel foil or titanium foil of 50 $\mu$m in thickness as the gas barrier layer 305 can be decreased in the total heat quantity leaking from the vacuum heat insulator as compared with the vacuum heat insulator using aluminum foil of 7 $\mu$m in thickness. The vacuum heat insulator using stainless steel foil or titanium foil smaller in thickness than 50 $\mu$m can be further decreased in the total heat quantity leaking from the vacuum heat insulator. Thus, the vacuum heat insulators having SUS foil A, SUS foil B, titanium foil A, and titanium foil B have an excellent insulating performance.

Embodiment 3c

Results of heat resistant durability test of vacuum heat insulator of the embodiment are reported. Samples of vacuum heat insulator used in the experiment are same as the vacuum heat insulators used in the preceding experiment 3b. In these samples of vacuum heat insulator, the internal pressure of the laminate bag is measured in advance. Then the vacuum heat insulator is put in a thermostatic oven at 100° C., and samples are taken out from the thermostatic oven at every specific time, and the internal pressure in the laminate bag is measured. On the basis of the result of measurement, the internal pressure in the laminate bag in 7 years is predicted. Results of experiment are recorded in Table 4.

TABLE 4

| | Changes of internal pressure | | | | |
|---|---|---|---|---|---|
| Composition | Initial value | 3 days | 12 days | 1825 days | 3650 days |
| Prior art 1 | 12 | 12 | 12 | 10 | 15 |
| Prior art 2 | 12 | 9.6 | 25 | — | — |
| SUS foil A | 1.1 | 1.1 | 1.1 | 9.0 | 14 |
| SUS foil B | 1.2 | 1.2 | 1.2 | 6.0 | 10 |
| Titanium foil A | 1.2 | 1.2 | 1.2 | 9.0 | 15 |
| Titanium foil B | 1.3 | 1.3 | 1.3 | 6.0 | 11 |

Generally, products using vacuum heat insulators are guaranteed of quality for a period of 7 to 10 years. In the samples of vacuum heat insulators of the embodiment, as shown in Table 4, the internal pressure predicted after use of 7 years is about 20 Torr or less. Therefore, the insulating performance can be assured for at least 7 years, and these are usable as insulators sufficiently for 7 years.

By contrast, the vacuum heat insulator having the aluminum deposition layer shown in prior art 2 presents an internal pressure in the laminate bag of about 25 Torr in 12 days from start of test, and the change of the internal pressure is very large. That is, gas has invaded into the laminate bag to raise the internal pressure. Therefore, the insulating performance of the vacuum heat insulator is lowered in long-term use at high temperature. That is, in the vacuum heat insulator in prior art 2, the heat resistance is not assured for a long period. Considering the use for 10 years, the vacuum heat insulator using the stainless steel foil or titanium foil of about 7 $\mu$m in thickness as the gas barrier layer 305 is preferred.

Embodiment 3d

Figure 3B:
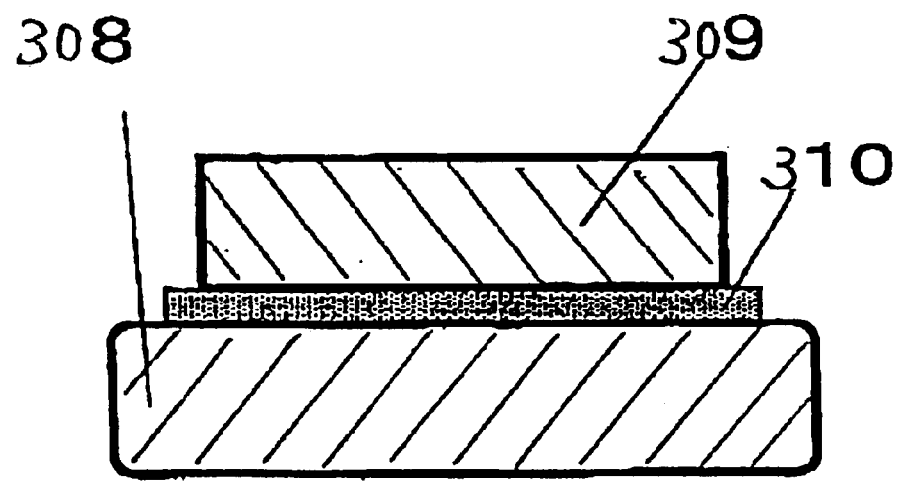
FIG. 3B is a sectional view showing a structure of an induction heating device using the vacuum heat insulator shown in FIG. 3A.

In the next experiment, the heating efficiency of the induction heating device using the vacuum heat insulator of the embodiment was investigated. The apparatus as shown in FIG. 3B was used in this experiment. That is, between the induction heating device 308 and the object of heating 309 which is the cooking container, the vacuum heat insulator 310 of the embodiment is inserted. That is, supposing the heating efficiency to be 100 when the vacuum heat insulator 310 is not inserted, the heating efficiency is measured when the vacuum heat insulator 310 is inserted.

The gas barrier layer 305 of the vacuum heat insulator used in the experiment includes aluminum foil of 7 μm in thickness, aluminum deposition layer of 0.05 μm in thickness, ferritic stainless steel foil SUS 430 of 1 to 100 μm in thickness, austenitic stainless steel foil 304 of 7 μm in thickness, and titanium foil of 7 μm thickness. Results of measurement are summarized in Table 5.

TABLE 5

| Type | Thickness (μm) | Heating efficiency | Situation |
|---|---|---|---|
| Without insulator | — | 100 | |
| Aluminum foil | 7.0 | 0 | Ignited |
| Aluminum deposition layer | 0.05 | 99.5 | |
| US430 foil | 1.0 | 99.0 | |
| | 5.0 | 95.0 | |
| | 7.0 | 93.0 | |
| | 10 | 90.0 | |
| | 15 | 85.0 | |
| | 20 | 80.0 | |
| | 50 | 50.0 | |
| | 100 | 0 | Ignited |
| US304 foil | 1.0 | 99.3 | |
| | 5.0 | 96.7 | |
| | 7.0 | 95.3 | |
| | 10 | 93.3 | |
| | 15 | 90.0 | |
| | 20 | 82.8 | |
| | 50 | 67.0 | |
| | 100 | 0 | Ignited |
| Titanium foil | 1.0 | 99.0 | |
| | 5.0 | 95.0 | |
| | 7.0 | 93.0 | |
| | 10 | 90.0 | |
| | 15 | 84.9 | |
| | 20 | 79.9 | |
| | 50 | 49.8 | |
| | 100 | 0 | Ignited |

As clear from Table 5, the vacuum heat insulator using stainless steel foil or titanium foil of 50 μm or less in thickness as the gas barrier layer 305 is hardly lowered in the heating efficiency if used in the induction heating device. In particular, the vacuum heat insulator using stainless steel foil or titanium foil of 10 μm or less in thickness has a heating efficiency of 90% or more, and has an extremely excellent insulating performance when used in induction heating device.

On the other hand, the vacuum heat insulator using aluminum deposition layer of 0.05 μm in thickness as the gas barrier layer 305 has a heating efficiency of 99.5%, and there is no effect on the heating efficiency, but as shown in Table 4, it is inferior in the heat resistant durability. Therefore, the vacuum heat insulator using aluminum deposition layer of 0.05 μm in thickness as the gas barrier layer 305 cannot be used in the induction heating device.

By contrast, the vacuum heat insulator using aluminum foil of 7 μm in thickness is ignited as the aluminum foil is heated by induction heating. Therefore, the heating efficiency could not be measured. Similarly, the vacuum heat insulator using stainless steel foil of 100 μm in thickness or titanium foil of 100 μm in thickness is ignited. Hence the heating efficiency could not be measured.

As explained herein, according to the constitution of the exemplary embodiment, the vacuum heat insulator capable of maintaining the excellent insulating performance for a long period is obtained.

Further, the vacuum heat insulator using metal passing high frequency magnetic field as the gas barrier layer exhibits an extremely excellent insulating performance as the heat insulator for induction heating device for heating water or food by heating the cooking container by induction heating with the high frequency magnetic field applied in the cooking container.

Exemplary Embodiment 4

A hot insulating device using the vacuum heat insulator of the exemplary embodiment of the invention is explained. The hot insulating device of the exemplary embodiment comprises a container for holding water or food, and a vacuum heat insulator disposed outside of the container. The vacuum heat insulator has a laminate bag and an insulting core contained in the laminate bag. The inside of the laminate bag is evacuated to vacuum, and is sealed. The laminate bag is made of a laminate film, and the laminate film has a seal layer, a gas barrier layer, and a protective layer.

In this constitution, since the inside of the laminate bag is kept in vacuum state, the vacuum heat insulator has a higher insulating performance than the conventional insulating material such as glass wool or urethane. Therefore, the hot insulating device of the embodiment has an extremely excellent insulating capacity owing to the actin of the vacuum heat insulator. Since the vacuum heat insulator uses the insulating core, the laminate bag for keeping vacuum is not required to withstand atmospheric pressure. That is, the insulating core has the function of reinforcing material to withstand the atmospheric pressure. As a result, the laminate film is very thin. Therefore, the hot insulating device of the embodiment is very light in weight. Further, since the laminate film has the protective layer, the vacuum heat insulator free from effects of external stress is obtained. As a result, a lightweight and rigid hot insulating device is obtained.

Preferably, the laminate bag of the vacuum heat insulator is made of a material passing magnetic field. In this constitution, the hot insulating device capable of heating by induction by application of high frequency magnetic field is obtained.

Preferably, the laminate film has an aluminum deposition layer as gas barrier layer. In this constitution, the surface radiation rate of the vacuum heat insulator is smaller, and hence the radiation heat from the insulator is smaller. As a result, the hot insulating device having a further excellent insulating performance is obtained.

Preferably, the laminate film has a deposition layer of a compound as gas barrier layer. In this constitution, loss of transmission of high frequency magnetic field is prevented. As a result, an induction heating-hot insulating device having an excellent insulating performance and excellent heating efficiency is obtained.

Preferably, the laminate film has a deposition layer evaporated to the support layer having glass transition point of 100° C. or higher as the gas barrier layer. In this constitution, even in the high temperature atmosphere, the vacuum heat insulator having excellent durability and insulating performance is obtained.

Preferably, the container is made of a material containing heat-sensitive metal. In this constitution, the temperature of the container can be measured by the magnetic field generator. Hence, the hot insulating device capable of finishing heating automatically at specified temperature is obtained.

Embodiments of the invention are described below while referring to the accompanying drawings.

Embodiment 4a

Figure 4A:
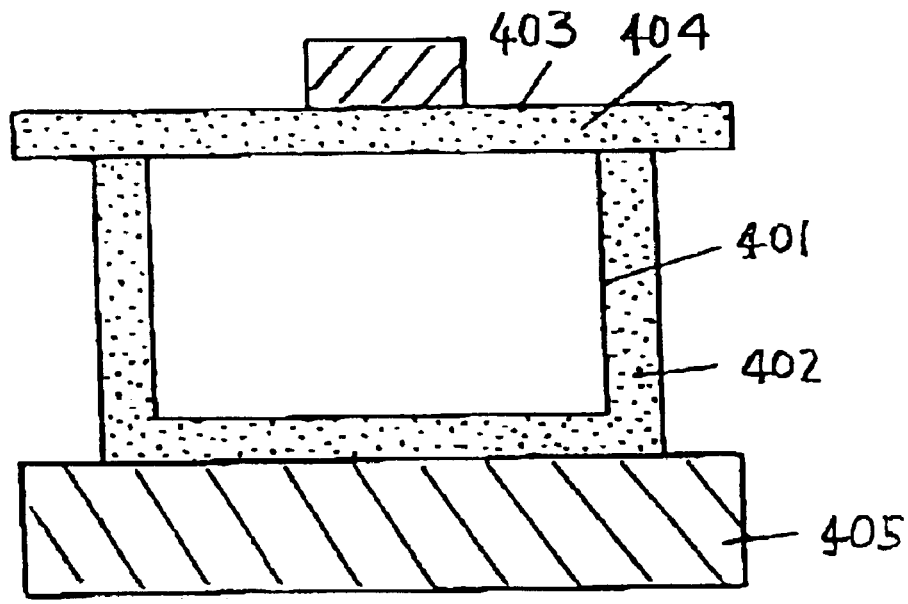
FIG. 4A is a longitudinal sectional view of a hot insulating device in a fourth embodiment of the invention.
Figure 4B:
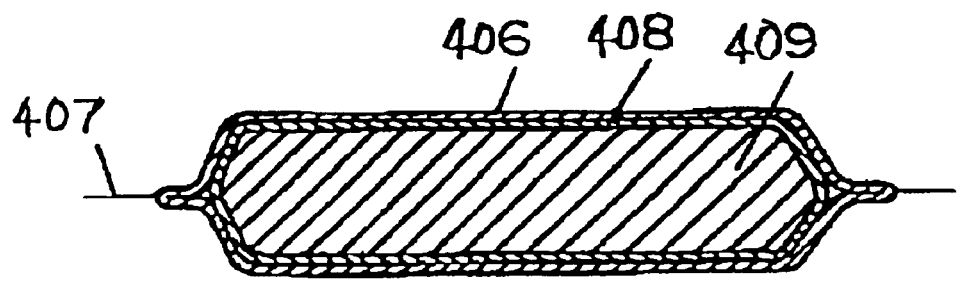
FIG. 4B is a sectional view of a vacuum heat insulator of the hot insulating device shown in FIG. 4A.
Figure 4C:
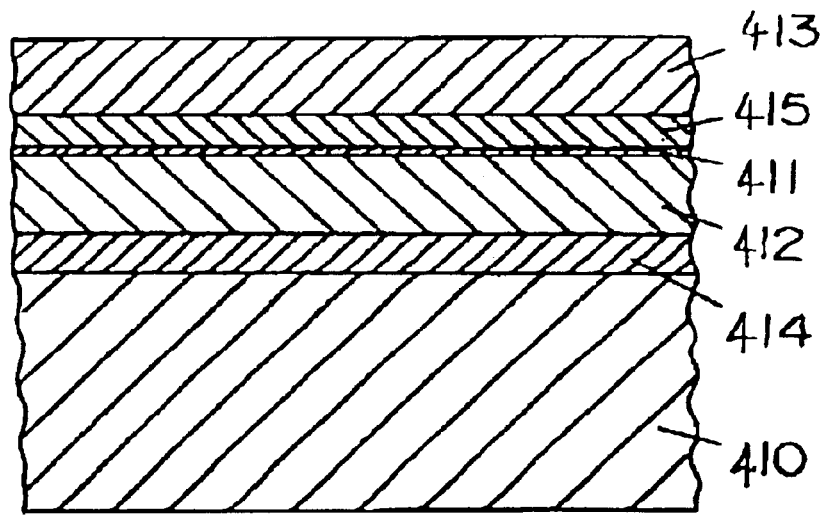
FIG. 4C is a sectional view of a laminate film of the hot insulating device shown in FIG. 4A.

The hot insulating device of the embodiment of the invention is explained by referring to FIG. 4A., FIG. 4B and FIG. 4C. In FIG. 4A, a container 401 for holding water or food is made of a ferromagnetic material, The surrounding of the container 401 is covered with a vacuum heat insulator 402. A vacuum heat insulator 404 is placed inside of a lid 403 of the hot insulating device. A magnetic field generator 405 has a function of generating a magnetic field for induction heating.

The composition of the vacuum heat insulators 402, 404 used in the embodiment is explained in FIG. 4B. The laminate bag is made of laminate film 406. In a seal portion 407, a plurality of laminate films 406, or folded laminate films 406 are adhered by mutual adhesion of heat fusion layers. An insulating core 409 is put in an inner bag 408. The inner bag 408 containing the insulating core 409 is put in the laminate bag.

The inside gas in the laminate bag of the vacuum heat insulators 402, 404 is exhausted, and is kept vacuum. The insulating core 409 has a very porous material. As the insulating core 409, for example, synthetic silica is used. Such insulating core 409 does not hold gas inside the core or in the gap, and the thermal conductivity of the core itself is very small. The inner bag 408 has a function of preventing scattering of core 409 or the like, As the inner bag, non-woven cloth or other material having gas permeability is used.

A detailed structure of the laminate film 406 is shown in FIG. 4C. The laminate film 406 has a seal layer 410, a support layer 412, a gas barrier layer 411, and a protective layer 413. The gas barrier layer 411 is disposed on the surface of the support layer 412 by vapor deposition or the like. The protective layer 413 has a function of protecting the entire laminate film from external stress. The seal layer 410 and support layer 412 are mutually adhered with an adhesive 414. The gas barrier layer 411 and protective layer 413 are mutually adhered with an adhesive 415.

As the heat fusion layer 410, a thermoplastic resin such as polyolefin or polyester may be used in this embodiment, the seal layer 410 is a undrawn polypropylene. The gas barrier layer 411 is thin layer of aluminum or the like, drawn metal, or deposition layer. In this embodiment, aluminum deposition layer is used as the gas barrier layer 411. When the gas barrier layer 411 is made of aluminum, high frequency magnetic field penetrates as far as its thickness is about 2 $\mu$m or smaller This has been confirmed by experiment.

The thickness of the aluminum deposition layer is about 50 nm, and the high frequency magnetic field passes sufficiently through the aluminum layer of this thickness. The surface heat radiation rate of the aluminum deposition layer is 0.01, and the heat radiation rate is extremely small. Since the heat radiation rate of the laminate film positioned on the surfaces of the vacuum heat insulators 402, 404 is extremely low, the radiation heat from the surfaces of the vacuum heat insulator 402, 404 is extremely small. As a result, the hot insulating device having an excellent insulating performance is obtained.

As the support layer 412, polyester, polyamide or polyimide may be used. In the embodiment, polyethylene naphthalate (PEN) is used as the support layer 412. When the gas barrier layer 411 is very thin, the life of the gas barrier layer 411 depends on the state of the support layer 412. When the resin having a glass transition point of 100° C. or lower is used as the support layer 412, if the hot insulating device exceeds 100° C., the laminate film for composing the vacuum heat insulators 402, 404 contacting with the hot insulating device also exceeds 100° C. At the same time, the support layer 412 also exceeds 100° C. Therefore, if using the resin having a glass transition point of 100° C. or lower as the support layer 412, the temperature of the support layer 412 changes, exceeding the glass transition point.

The resin drastically changes its properties at the glass transition point. In particular, large expansion or shrinkage occurs at the glass transition point. If the dimension of the support layer 412 is changed notably, the gas barrier layer 411 contacting with the support layer is pulled and stressed corresponding to expansion or shrinkage of the support layer, and is cracked. That is, due to difference in coefficient of thermal expansion between the support layer 412 and gas barrier 411, crack or pin hole may be formed in the gas barrier layer 411. Through the crack, fresh air invades into the vacuum heat insulator, and the internal pressure of the vacuum heat insulator increases, thereby lowering the insulating performance of the vacuum heat insulator. Accordingly, when heating and insulating the content including water and liquid, if using the support layer 412 having a glass transition point of 100° C. or lower, the durability of the vacuum heat insulator is impaired due to the stress applied to the gas barrier layer 411. Since the glass transition point of the PEN is about 120° C., a vacuum heat insulator having an extremely high durability performance is obtained. As the protective layer 413, polyolefin, polyester, polyamide, polyimide, polycarbonate, fluoroplastic, or their combined material may be used. In this embodiment, the PEN is used as the protective layer 413.

The action of this composition is explained. First, water or food is put in the ferromagnetic container 401, and the lid 403 is put on. The container 401 is put on a magnetic field generator 405 such as an electromagnetic cooker, and a high frequency magnetic field is applied. The applied high frequency magnetic field penetrates through the vacuum heat insulator 402, and reaches the container 401. Since the container 401 is ferromagnetic, the container 401 is heated by eddy current. By the container 401 heated to high temperature, the water or food in the container 401 is heated. After specified heating, the operation of the magnetic field generator 405 is stopped. If kept in this state or moved and used, the heat in the container 401 is isolated by the vacuum heat insulators 402, 402 surrounding the container 401, and hardly escapes outside. As a result, the water or food in the container 401 is kept at high temperature state for a long period.

Specific examples of experiment are given below. The following samples of hot insulating device are used in the experiment.

4A: Hot insulating device having the constitution of the embodiment (ordinary device).

4B: Hot insulating device using glass wool instead of vacuum heat insulator (glass wool device).

4C: Hot insulating device using vacuum double container of stainless steel instead of vacuum heat insulator (vacuum double container device).

4D: Hot insulating device using aluminum foil of 6 $\mu$m in thickness as gas barrier layer of laminate film (aluminum foil device).

4E: Hot insulating device using PET resin as support layer of gas barrier layer of laminate film (PET device).

In each hot insulating device, first, the container 401 is filled with one liter of water at 20° C. Using electric power of 1 kW, a high frequency magnetic field is generated. By the induction heat of the high frequency magnetic field, when water boils, application of high frequency magnetic field is stopped. Letting stand at room temperature in this state, the temperature in the container 401 is measured in 6 hours. This operation is repeated. Results of the experiment are given in Table 6. The mass of each hot insulating device is also recorded in Table 6.

TABLE 6

|  | | 1st | | 100th | |
| --- | --- | --- | --- | --- | --- |
|  | Mass (g) | Water boiling time (min) | Container temperature (° C.) | Water boiling time (min) | Container temperature (° C.) |
| Ordinary device | 500 | 7.0 | 90 | 7.0 | 90 |
| Glass wool device | 550 | 7.2 | 75 | 7.2 | 75 |
| Vacuum double container device | 1300 | Not heated | Unable to test | Not heated | Unable to test |
| Aluminum foil device | 500 | Not heated | Unable to test | Hot heated | Unable to test |
| PET device | 500 | 7.0 | 90 | 7.1 | 60 |

As clear from Table 6, the ordinary device has a light mass, and is excellent in induction heating performance, insulating performance, and durability.

Embodiment 4b

Figure 4D:
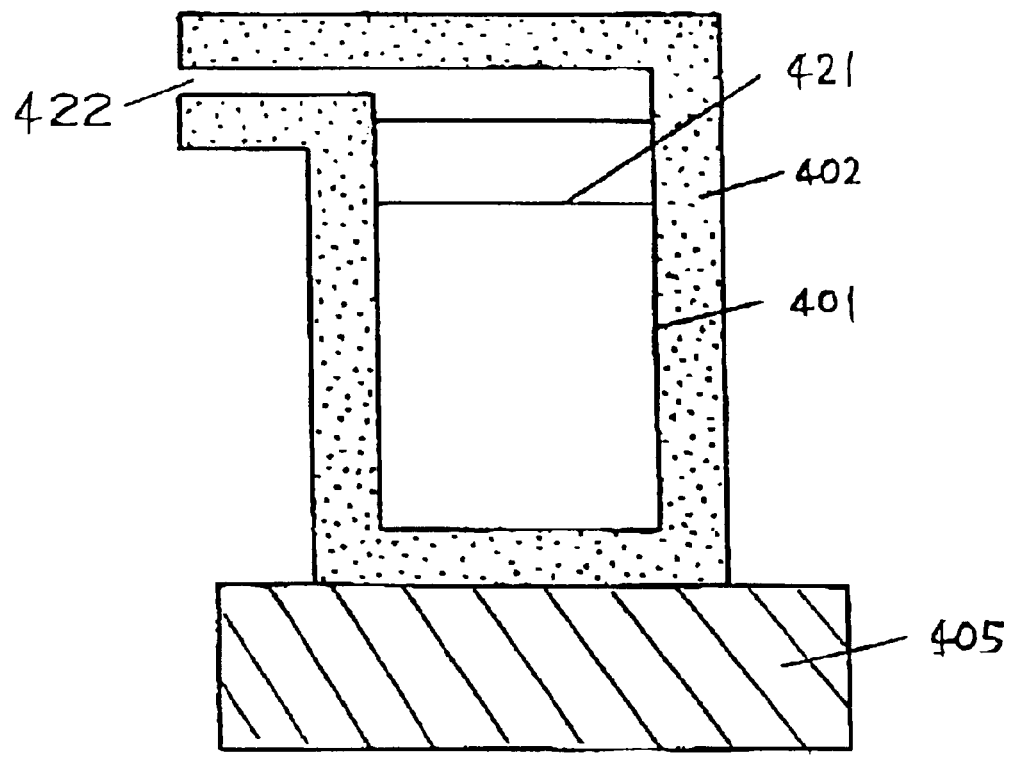
FIG. 4D is a longitudinal sectional view of a hot insulating device in other embodiment of the invention.
Figure 4E:
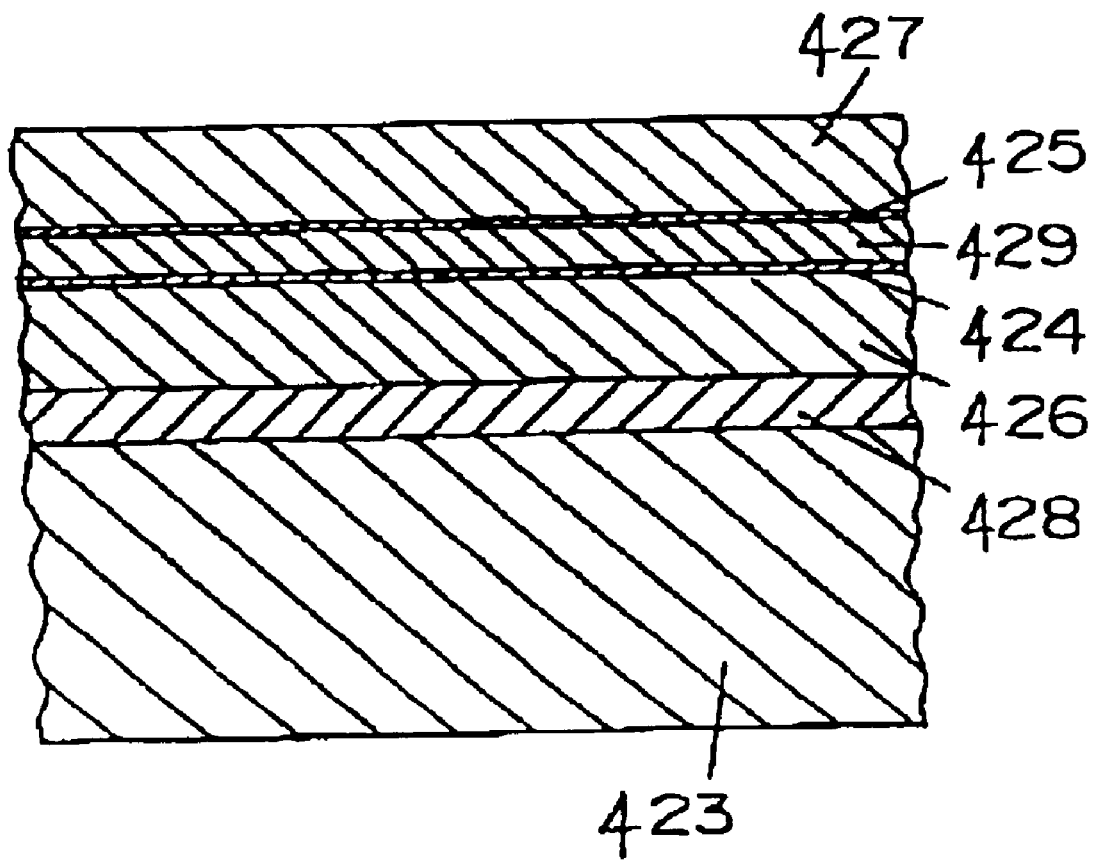
FIG. 4E is a sectional view of a laminate film of the hot insulating device shown in FIG. 4D.

Other experiment of the exemplary embodiment is explained by referring to FIG. 4D and FIG. 4E. Same parts are in embodiment 4a are identified with same reference numerals and their description is omitted.

FIG. 4D shows a pot type hot insulating device. The hot insulating device as the upper limit water level 421 in ordinary state. The hot insulating device has a tap 422, and this tap 422 is a port for pouring the water or liquid in the container 401 to outside.

A sectional view of the laminate film used in the embodiment is shown in FIG. 4E. The laminate film has a heat fusion layer 423, gas barrier layers 424, 425, a protective layer 427, and adhesive layers 428, 429. The gas barrier layer 424 is adhered to the surface of the support layer 426 by vapor deposition or the like. The gas barrier layer 425 is adhered to the protective layer 427 by vapor deposition or the like, using the protective layer 427 as the base material. The adhesive layer 428 adheres the heat fusion layer 423 and support layer 426, and the adhesive layer 429 adheres the gas barrier layer 424 and gas barrier layer 425.

As the gas barrier layers 424, 425, metal deposition layer, or deposition layer of compound of alumina or silica may be used in this embodiment, a deposition layer of silica as compound is used.

When a compound is used in the gas barrier layers 424, 425, since the high frequency magnetic field penetrates through the gas barrier layers of this compound, loss of high frequency magnetic field energy is prevented. Hence, an ideal induction heating is possible in this embodiment, two gas barrier layers 424, 425 are provided on both sides of the adhesive layer, but not limited to this composition, the gas barrier layer may be disposed in a single layer, or two or more layers. As the first gas barrier layer 424 and the second gas barrier layer 425 are close to each other, if a pin holes are formed in the gas barrier layer, the pin holes are plugged with each other, and invasion of fresh air into the vacuum heat insulator is prevented. As a result, the vacuum heat insulator and hot insulating device of a very high reliability are obtained. In this embodiment, the material of the container 401 is a heat-sensitive metal changing from ferromagnetic property to weak magnetic property.

The operation of the embodiment is explained. First, water or liquid is poured into the container 401 up to the line 421. The container 401 is put on the magnetic field generator 405, and high frequency magnetic field is generated. By the high frequency magnetic field, the container 401 is heated, and the water or liquid in the container 401 is heated. At the water boiling temperature, the heat-sensitive metal changes to weak magnetic property. The change of magnetic property of the heat-sensitive metal is detected by the magnetic field generator 405, and the magnetic field generator 405 automatically stops generation of magnetic field. As a result, water heating is finished automatically. The container holding the boiling water may be kept in the same place or may be moved. By inclining the container 401, the water is poured out from the tap 422. As the tapping method, besides, the air pump system, power pump system or the like may be employed.

Specific examples of experiment are given below. The following samples of hot insulating device are used in the experiment.

4F: Hot insulating device having the constitution of the embodiment (ordinary device).

4G: Hot insulating device using glass wool instead of vacuum heat insulator (glass wool device).

4H: Hot insulating device using vacuum double container of stainless steel instead of vacuum heat insulator (vacuum double container device).

4I: Hot insulating device using aluminum foil of 6 μm in thickness as gas barrier layers 424, 425 of laminate film (aluminum foil device).

4J: Hot insulating device using aluminum deposition layer of 50 nm in thickness as gas barrier layers 424, 425 of laminate film (aluminum deposition device).

4K: Hot insulating device using PET resin as support layer of gas barrier layers 424, 425 of laminate film (PET device).

In each hot insulating device, first, the container 401 is filled with one liter of water at 20° C. Using electric power of 1 kW, a high frequency magnetic field is generated. By the induction heat of the high frequency magnetic field, when water boils, application of high frequency magnetic field is stopped.

Letting stand at room temperature in this state, the temperature in the container 401 is measured in 6 hours. This operation is repeated. Results of the experiment are given in Table 7. The mass of each hot insulating device is also recorded in Table 7.

TABLE 7

|  | Mass (g) | 1st | | 100th | |
| --- | --- | --- | --- | --- | --- |
|  |  | Water boiling time (min) | Container temperature (° C.) | Water boiling time (min) | Container temperature (° C.) |
| Ordinary device | 500 | 6.8 | 89 | 6.8 | 89 |
| Glass wool device | 550 | 7.2 | 75 | 7.2 | 75 |
| Vacuum double container device | 1300 | Not heated | Unable to test | Not heated | Unable to test |
| Aluminum foil device | 500 | Not heated | Unable to test | Not heated | Unable to test |
| Aluminum deposition device | 500 | 7.0 | 90 | 7.0 | 90 |
| PET device | 500 | 7.0 | 90 | 7.1 | 80 |

As clear from the table, the ordinary device has a light mass and can be heated by induction, and is excellent in insulating performance, and durability. By comparison of hot insulating devices using aluminum deposition layer and silica deposition layer as the gas barrier layers 424, 425, a slight loss of magnetic field is found in the hot insulating device having aluminum deposition layer. Accordingly, the hot insulating device having silica deposition layer has a superior heating efficiency as compared with the hot insulating device having aluminum deposition layer. However, since the aluminum deposition layer is smaller in the heat radiation rate, the radiation heat is smaller. Therefore, the hot insulating device having aluminum deposition layer is higher in insulating performance than the hot insulating device having silica deposition layer. Therefore, whether either the aluminum deposition layer or silica deposition layer should be used, or both should be used may be properly selected depending on the method of use of the hot insulating device.

As clear from the description herein, by the constitution of the embodiment, a hot insulating device having an extremely high insulating performance may be obtained. Further, a hot insulating device of lighter weight is obtained. Still more, a hot insulating device having an excellent durability is obtained.

In addition, since the vacuum heat insulator passes high frequency magnetic field, the hot insulating device capable of heating from outside by induction heating is realized.

By forming the container of a material containing heat-sensitive metal, the hot insulating device capable of controlling the temperature or heating automatically is realized.

Exemplary Embodiment 5

An electric water heater using a vacuum heat insulator of an exemplary embodiment of the invention is explained. The electric water heater of the exemplary embodiment comprises a water storage container, a heater for heating the water in the container, a tapping route for discharging the water, and a vacuum heat insulator disposed around the water storage container. The vacuum heat insulator has a laminate bag, and an insulating core placed in the laminate bag, and the inside of the laminate bag is evacuated to vacuum. The laminate bag is made of a laminate film, and the laminate film has the gas barrier layer, a protective layer, and a seal layer.

The gas barrier layer has a resin film base material, and a deposition layer evaporated to the base material. The protective layer is disposed on the surface of the deposition side of the deposition layer, and is made of the same material as the resin film base material. The seal layer is positioned at the inside of the laminate bag as the seal layers are mutually adhered, the laminate bag is sealed.

In this constitution, without breakage of gas barrier layer, the internal vacuum state of the laminate bag is held. Hence, the excellent insulating performance of the vacuum heat insulator is maintained for a long time without decline. As the deposition layer is used for the gas barrier layer, the heat flowing into the low temperature part from the high temperature part through the gas barrier layer itself is kept to minimum. Therefore, the insulating performance of the entire vacuum heat insulator is enhanced. As a result, the hot insulating electric power of the electric water heater can be curtailed. The vacuum heat insulator in this exemplary embodiment has a thermal conductivity of about 0.006 kcal/m·h·° C. (0.007 W/m·K) at 25° C.

The electric water heater having the vacuum heat insulator having the gas barrier layer to which the deposition layer is evaporated is small in the heat quantity leaking from the end through the gas barrier layer itself and hence the hot insulating electric power is kept smaller as compared with the electric water heater having the vacuum heat insulator using metal foil gas barrier layer.

Moreover, since the protective layer and base material are made of same material, thermal expansion or thermal shrinkage caused by temperature changes of the protective layer and base material is always the same. It hence prevents generation of uneven stress of deposition layer due to thermal expansion or thermal shrinkage, and breakage of deposition layer is avoided. As a result, the durability of the vacuum heat insulator is enhanced, and the thermal durability of the electric water heater is improved. By contrast, if the protective layer and base material are made of different materials, the coefficient of thermal shrinkage is different between the base material of the gas barrier layer and the protective layer of the deposition side, and an uneven stress is generated in the deposition layer. As a result, the deposition layer may be cracked, and the insulating performance of the vacuum heat insulator drops.

Preferably, the gas barrier layer has a plurality of gas barrier layers, and at least two deposition layers are laminated so that each deposition side may face each other if the deposition layers have small holes called pin holes, by adhering the deposition sides together, the positions of the pin holes are mutually covered, and invasion of fresh air into the vacuum heat insulator is prevented. As a result, the gas barrier performance is improved substantially. In this constitution, the internal vacuum of the laminate bag is maintained for a long period, and the durability of the insulating performance of the vacuum heat insulator is extremely enhanced. Hence, the thermal durability of the electric water heater is further enhanced.

Preferably, the laminate film further has a metal foil. The metal foil functions as gas barrier layer. That is, the laminate film has the gas barrier layer of the deposition layer and metal foil. In this constitution, the thermal durability of the vacuum heat insulator is enhanced, and hence the thermal durability of the electric water heater is further improved.

Preferably, the laminate film further has a metal foil, and the metal foil is cut off at a position of the end of the opposite side of the water storage container of the vacuum heat insulator. The metal foil is disposed at a position excluding the end of the laminate bag. As the gas barrier layer has a deposition layer, the heat flowing into the low temperature side from the high temperature part through the gas barrier layer itself can be suppressed, and moreover since the metal foil is disposed at a position excluding the end of the laminate bag, heat conduction from the high temperature side to the low temperature side through the metal foil is prevented. Accordingly, the heat resisting temperature of the vacuum heat insulator is further enhanced, and the hot insulating electric power of the electric water heater is suppressed much lower.

Preferably, the laminate film further has a metal foil, and the seal portion by mutual heat fusion of seal layers of the laminate film is folded to the opposite side of the container. By folding the seal portion including the metal foil to outside, leak of heat from the seal portion through the metal foil itself is prevented. As a result, the hot insulating electric power of the electric water heater is saved. The thermal durability of the electric water heater is further enhanced.

Preferably, the resin film base material has polyethylene naphthalate. Since polyethylene naphthalate has a high heat resisting temperature, if the vacuum heat insulator is used in high temperature atmosphere, breakage of the deposition layer is prevented. As a result, the thermal durability of the vacuum heat insulator is enhanced and the thermal durability of the electric water heater is enhanced.

Embodiments of the invention are described below while referring to the drawings.

Embodiment 5a

Figure 5A:
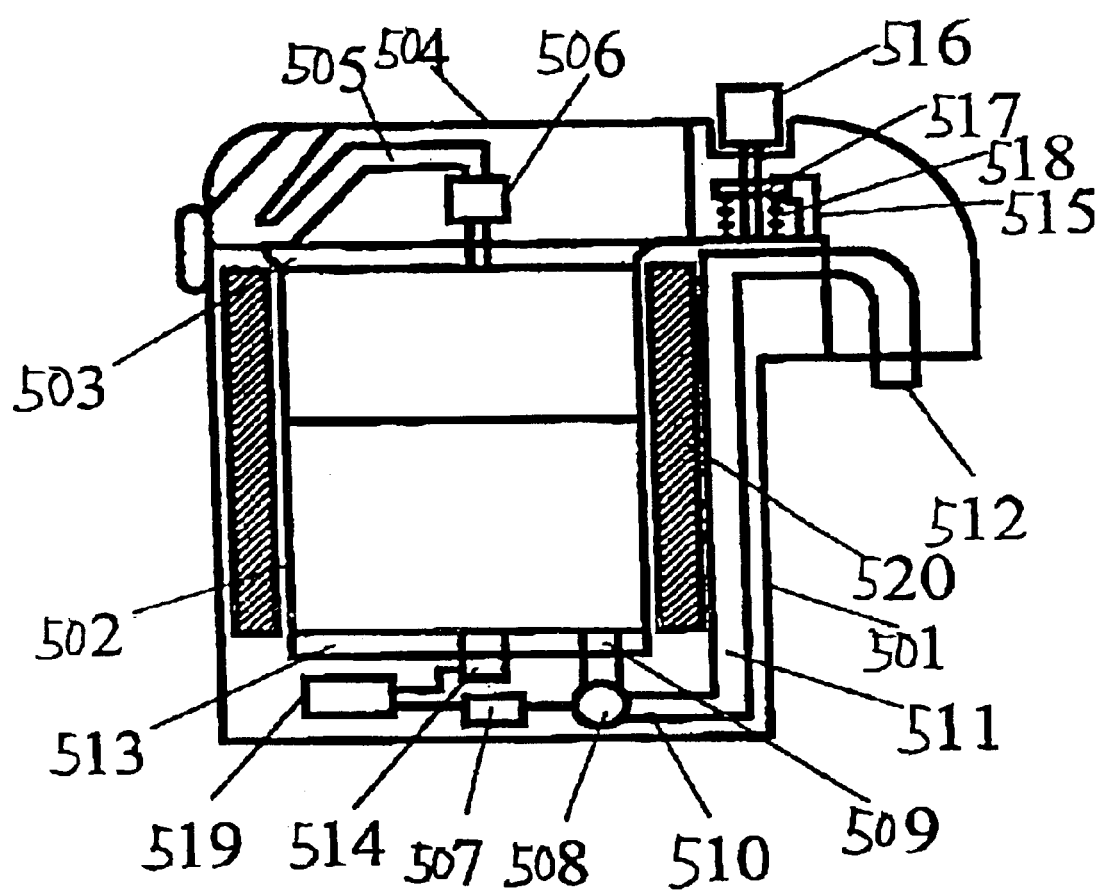
FIG. 5A is a longitudinal sectional view of an electric water heater in a fifth embodiment of the invention.

The electric water heater of the embodiment is described while referring to FIG. 5A to FIG. 5F. In FIG. 5A, an electric water heater main body 501 (main body hereinafter) comprises a water storage container 502 (container hereinafter), a middle stopper 503, an upper lid 504, a water leak preventive valve 506, a steam passage 505, a motor 507, a pump 508, a suction port 509, a discharge port 510, a tapping pipe 511, a tap 512, a heater 513, a temperature detector 514, a start switch 515, a pushbutton 516, a rod 517, a compression spring 518, a controller 519, and a vacuum heat insulator 520.

The container 502 is disposed inside of the main body, and has a function of storing water. The container 502 has a cylindrical shape measuring 184 mm in inside diameter and 200 mm in depth. The middle stopper 503 is disposed to seal the opening of the container 502. The upper lid 504 closes the upper part of the main body 501. The steam passage 505 is disposed in the upper lid, and one end of the steam passage 505 communicates with the inside of the container 502 through the middle stopper 503, while the other end communicates with the atmosphere. The water leak preventive valve 506 is disposed in the steam passage 505, and has a function of cutting off the steam passage 505 in case of tumbling or collapse. The steam passage 505 is bent in a complicated form. Accordingly, when the water in the container 502 boils, in the case the inside pressure of the container 502 is higher than the atmospheric pressure, the steam is discharged outside of the main body 501 through the steam passage 505, and hence the fresh air is not mixed easily with the air between the water level in the container 502 and the upper lid 504 (called internal air hereinafter). The motor 507 is disposed in the bottom between the main body 501 and the container 502. The pump 508 is driven by the motor 507. The suction port 509 of the pump 508 communicates with the bottom of the container 502. The discharge port 510 of the pump 508 communicates with the tapping pipe 511. The hot water is poured out of the electric water heater through the tap 512. Therefore, in the tapping route, the hot water runs through the container 502, suction port 509, pump 508, discharge port 510 of pump 508, and tapping pipe 511, and flows out from the tap 512. The heater 513 has a doughnut shape with a hollow center, and is disposed in the lower part of the container 502. The start switch 515 for driving the motor 507 has a variable resistor, and is actuated through the rod 517 by the pushing operation of the pushbutton 516. The spring 518 is thrusting the rod 517 always in the upward pushing direction. The controller 519 receives a signal from the temperature detector 514, and controls the heater 513 and others The vacuum heat insulator 520 is disposed as being wound to the side of the container 502. The vacuum heat insulator 520 prevents the heat of the container 502 from escaping from the side of the main body 501.

Figure 5B:
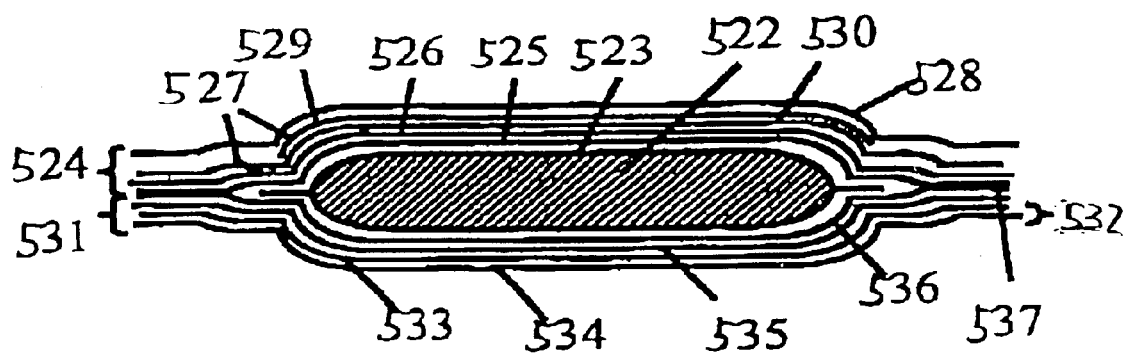
FIG. 5B is a sectional view of a vacuum heat insulator used in the electric water heater in the embodiment of the invention.
Figure 5C:
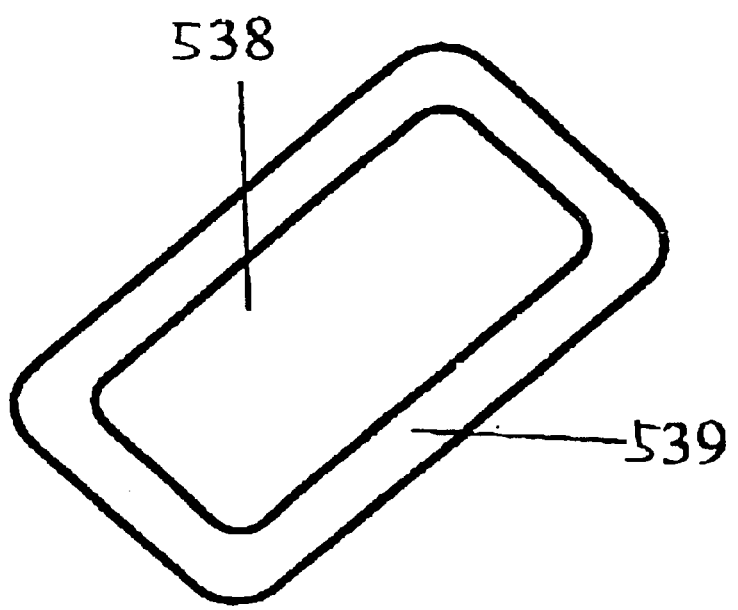
FIG. 5C is a plan of the vacuum heat insulator used in the electric water heater in the embodiment of the invention.

The vacuum heat insulator 520 is explained in detail. FIG. 5B is a sectional view of the vacuum heat insulator 520. The vacuum heat insulator 520 has a laminate bag, an inner bag 523, and an insulating core 522. The core 522 is put in the inner bag 523. The inner bag 523 is disposed in the laminate bag. The inner bag 523 is formed by adhering the laminate films 524, 531. The inside of the laminate bag is evacuated to vacuum, and the vacuum heat insulator 520 has a flat rectangular shape as shown in FIG. 5C. The existing portion of the core 522 is the insulating portion 538. In the heat seal portion 537, the seal layers 525, 536 are fused and sealed.

Figure 5D:
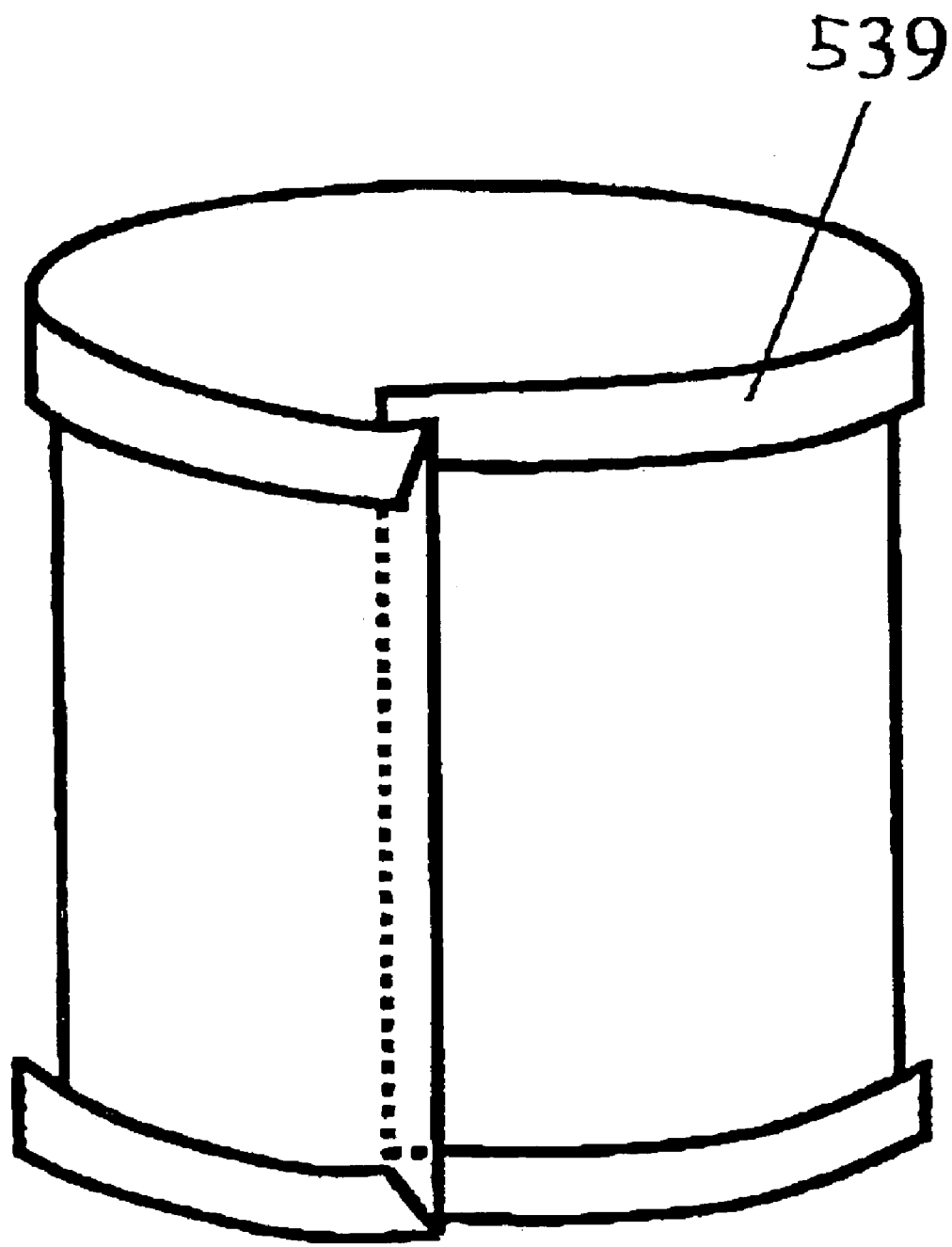
FIG. 5D is a perspective view of the vacuum heat insulator used in the electric water heater in the embodiment of the invention.
Figure 6E:
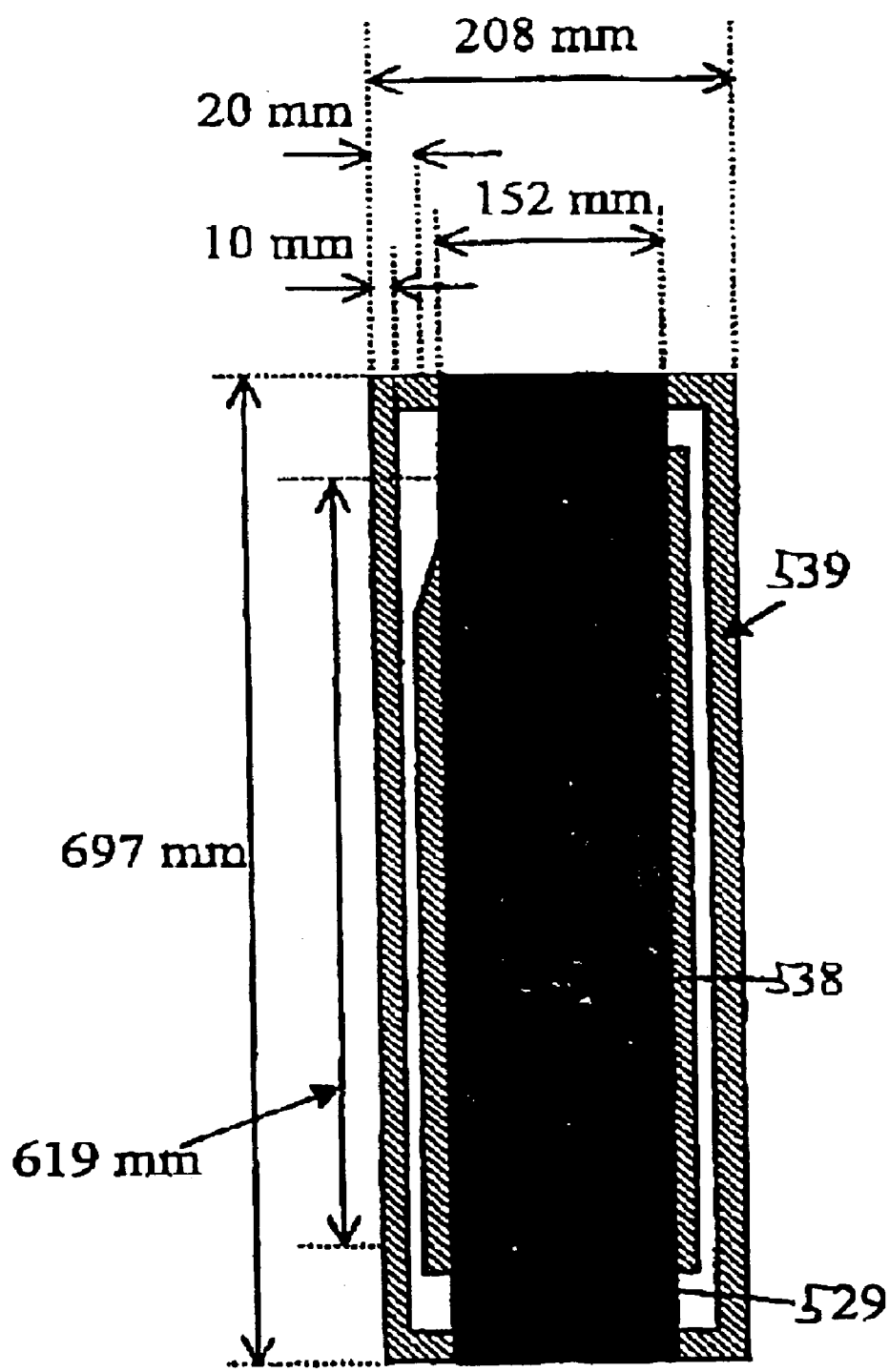
FIG. 6 is a sectional view showing a structure of a conventional vacuum heat insulator.

As shown in FIG. 5D, the vacuum heat insulator 520 is wound around the water storage container 502. The inside of the vacuum heat insulator 520 directly contacts with the container. Therefore, the inner side of the vacuum heat insulator 520 requires the material having higher thermal durability and better gas barrier performance than the opposite side.

The laminate film 524 includes a seal layer 525, a base material 526, a gas barrier layer 527, a protective layer 528, and a gas barrier layer 529. The laminate film 531 includes a protective layer 532, a gas barrier layer 535, and a seal layer 536. The core 522 is made of a material having a small thermal conductivity. Holes and gaps formed in the core 522 communicate with the outside of the core. The core 522 is made of organic or inorganic material. When the vacuum heat insulator is used in high temperature condition as in the electric water heater, a material not generating heat at high temperature is used. Usable materials for the core include pearlite, sandy balloon, synthetic silica, etc. In the embodiment, synthetic silica powder is used as the core 522. The synthetic silica powder has very fine particles, and the thermal conductivity of particles is very small. Further, the core using the synthetic silica powder shows a very small thermal conductivity, regardless of the pressure, at pressure of 20 Torr or less. Accordingly, the vacuum heat insulator using synthetic silica exhibits an extremely excellent insulating performance when used at high temperature.

The seal layers 525, 536 have the role of keeping vacuum inside the adhered laminate films 524, 531. As the seal layers, materials to be heated and sealed easily are preferred.

Since the electric water heater is heated to temperature of about 100° C., the seal layer is preferred to be made of a material not deteriorating at 100° C. In this embodiment, the seal layers 525, 536 are made of undrawn polypropylene. This polypropylene is a polymer having a high heat resistance, and having a properly enhanced in crystallinity.

The gas barrier 527 of the first laminate film 524 has an aluminum foil 529 and an aluminum deposition layer 530. The aluminum foil 529 has enough width to cover the core 522. The second gas barrier layer 535 of the second laminate film 531 is made of an aluminum foil. These gas barrier layers 527, 535 have the role of cutting off the gas passing through the laminate films 524, 531. If the laminate films 524, 531 do not have large gas shielding property, the internal pressure of the vacuum heat insulator 520 rises. When the internal pressure of the vacuum heat insulator 520 exceeds 20 Torr, the thermal conductivity of the vacuum heat insulator 520 also climbs up, and when the internal pressure further elevates, its thermal conductivity becomes extremely larger than the insulating performance of the initial vacuum heat insulator. Therefore, as the laminate film, the performance capable of cutting off the gas for a long period at temperature of about 100° C. is required. The greater the thickness of the shielding material for cutting off the gas penetration, the higher is the long-term reliability. However, a metal is used as the gas barrier layer of the vacuum heat insulator, and the thickness of the metal becomes smaller, the heat quantity propagating through the metal itself is smaller, and the heat insulation is improved.

In the embodiment, therefore, as the gas barrier layer 527, both aluminum foil 529 of 5 to 6 $\mu$m, and aluminum deposition layer 530 of 30 to 100 nm in thickness are used. As the gas barrier layer 535, aluminum foil of 5 to 6 $\mu$m, or aluminum deposition layer of 30 to 100 nm is used. The thickness of the deposition layer 530 is preferred to be in a range of 30 to 100 nm, but not limited to this thickness, it may be used in any desired thickness.

In the laminate film 524, the protective layer 528 has a role of protecting the seal layer 525 and gas barrier layer 529. In the laminate film 531, the protective layer 532 has a role of protecting the gas barrier layer 535 and seal layer 536. It is most preferred that the base material 526 and protective layer 528 are same in the coefficient of thermal shrinkage, but not limited to this, any desired materials may be used. If the coefficient of thermal shrinkage is different between the protective layer and base material disposed at both sides of the deposition layer, an uneven stress acts son the deposition layer, and the deposition layer may be broken. Such breakage of the deposition layer is prevented when the base material and protective layer are made of same material, and the heat resistance and long-term reliability of the vacuum heat insulator are enhanced.

In the embodiment, the base material 526 and protective layer 528 are made of polyethylene naphthalate (PEN). At 100° C. corresponding to the maximum temperature in the electric water heater, the coefficient of thermal shrinkage of PEN is about 0.4% or lower, and the coefficient of thermal shrinkage of PEN is very small as compared with that of PET. At this level of thermal shrinkage, the deposition layer is not broken. In the laminate film 531, at a position directly contacting with the gas barrier layer, the polyester layer 533 is disposed. As the polyester layer 533, PET is used.

Although PET is slightly inferior to PEN in heat resistance, the laminate film 531 side does not directly contact with the water storage container 502, and the maximum temperature is about 40° C. Hence, the laminate film 531 using PET as the protective layer sufficiently satisfies the heat resistance. Further, a nylon layer 534 is disposed in the outermost layer of the protective layer 532. During use of electric water heater, when mounting or dismounting the electric water heater, the electric water heater often contacts with other parts and is likely to be damaged. However, the nylon has a high slipping performance and is rarely injured. By disposing the slipping nylon in the outermost layer, the vacuum heat insulator can be installed smoothly and the assembling performance is enhanced.

When winding the vacuum heat insulator around the container 502, the heat seal may be broken. At this time, as shown in FIG. 5D, the vacuum heat insulator is wound around the container 502 so that the seal portion may be positioned at the outside of the cylindrical form. Thus, the end portion of the container 502 is the aluminum deposition layer only, and the heat propagating through the aluminum itself can be suppressed. As a result, the insulating performance of the entire vacuum heat insulator is enhanced.

The action of the embodiment is explained. Water is poured into the container 502, and the power is turned on. The water temperature in the container 502 is measured by the temperature detector 514, and its signal is sent into the controller 519, and the controller starts to supply power into the heater 513 by receiving this signal. When the water in the container 502 boils power feed to the heater 513 is stopped. Then, receiving a signal from the temperature detector 514, the controller 519 controls the heater 513 so that the temperature of the container 502 may be kept nearly at a constant temperature. When tapping, the pushbutton 516 is pressed. The motor 507 operates and the water in the container 502 is discharged outside of the electric water heater from the tap 512 through the tapping pipe 511 by means of the pump 508.

Embodiment 5b

Examples of experiment of heat insulation and thermal durability of various vacuum heat insulators are shown below. The following samples of vacuum heat insulators are prepared.

5A: Vacuum heat insulator having aluminum foil with gas barrier layer disposed at both sides (both-side foil).

5B: Vacuum heat insulator having aluminum deposition layer with gas barrier layer disposed at both sides, using PET in deposition base material and PEN protective layer (both-side deposition PET).

5C: Vacuum heat insulator having aluminum deposition layer with gas barrier layer disposed at both sides, using PEN in base material and PEN protective layer (both-side deposition PEN).

Using these vacuum heat insulators, as shown in FIG. 5D, the vacuum heat insulator is wound around the container 502 in a cylindrical form. The vacuum heat insulator is wound around the container 502 so that the seal portion may come to the outside of the cylindrical vacuum heat insulator. In this way, the electric water heaters having these vacuum heat insulators are fabricated. Pouring water into the container of each electric water heater, the hot insulating electric power is measured. The water is kept at 96.5° C., and the ambient temperature is 20° C. The temperature is measured in well balanced state. Results of experiment are summarized in Table 8.

TABLE 8

| Composition | Insulating power (Wh/h) | Power difference from both-side foil (Wh/h) |
|---|---|---|
| Both-side foil | 31.8 | 0 |
| Both-side deposition PET | 28.7 | −3.1 |
| Both-side deposition PEN | 28.7 | −3.1 |

The vacuum heat insulator using aluminum deposition layer as the gas barrier layer of vacuum heat insulator is lower in the electric power required for hot insulation than the vacuum heat insulator using aluminum foil. That is, by using aluminum deposition layer as gas barrier layer, the heat quantity propagating through the gas barrier layer itself can be suppressed, and the insulating performance of the vacuum heat insulator is enhanced. Therefore, by using such vacuum heat insulator, an electric water heater small in electric power for hot insulation is realized.

Embodiment 5c

A thermostatic oven at 100° C. is prepared. The following vacuum heat insulators are used.

5A: Vacuum heat insulator having same both-side foil as in experiment 5a.

5B: Vacuum heat insulator having same both-side deposition PET as in experiment 5a.

5C: Vacuum heat insulator having same both-side deposition PEN as in experiment 5a.

In these samples, the internal pressure of the vacuum heat insulator is measured preliminarily, and all vacuum heat insulators are put in the thermostatic oven at 100° C., and the heat resistance is tested. The vacuum heat insulators using both-side deposition PET are taken out of the thermostatic oven in 3 days and 12 days, and the internal pressure is measured. The vacuum heat insulators using both-side foil are taken out of the thermostatic oven in 3 days, 12 days, 1825 days, and 3650 days, and the internal pressure is measured. The vacuum heat insulators using both-side deposition PEN are taken out of the thermostatic oven in 3 days, 224 days, and 336 days, and the internal pressure is measured. Herein, the temperature of 100° C. is the maximum temperature exposed to the vacuum heat insulator used in the electric water heater, that is, the temperature of the part contacting with the container 502 when the cylindrical vacuum heat insulator is wound around the container 502. Results of heat resistance test of these vacuum heat insulators are summarized in Table 9.

TABLE 9

| Composition | Internal pressure (Torr) | | | | | |
|---|---|---|---|---|---|---|
| | Before | 3 days | 12 days | 224 days | 336 days | 1825 days | 3650 days |
| Both-side foil | 1.2 | 1.2 | 1.2 | | | 20 or less | 20 or less |
| Both-Side deposition PET | 1.2 | 9.6 | 20 or more | | | | |
| Both-side deposition PEN | 1.2 | 1.5 | | 16 | 20 or more | | |

In Table 9, at temperature of about 100° C., the vacuum heat Insulators comprising the gas barrier layer having aluminum deposition layer, the base material having PEN, and the protective layer having PEN exhibit the best long-term heat resistance and reliability. That is, the vacuum heat insulator having the base material and protective material made of same material exhibits an extremely excellent long-term reliability. As a result, the electric water heater not lowered in the insulating performance for a long period and small in hot insulation power consumption is realized. However, the vacuum heat insulator comprising the deposition base material having PET and the protective layer having PEN is slightly inferior in heat resistance.

Embodiment 5d

A thermostatic oven at 100° C. is prepared. The following vacuum heat insulators are used.

5A: Vacuum heat insulator having same both-side foil as in experiment 5a.

5C: Vacuum heat insulator having same both-side deposition PEN as in experiment 5a.

5D: Vacuum heat insulator using aluminum foil as gas barrier layer of one laminate film, and aluminum deposition layer using PEN as base material as shown in FIG. 5E as gas barrier layer of other laminate film, and placing aluminum foil 539 in the portion 537 contacting with the core (one-side foil).

Figure 5F:
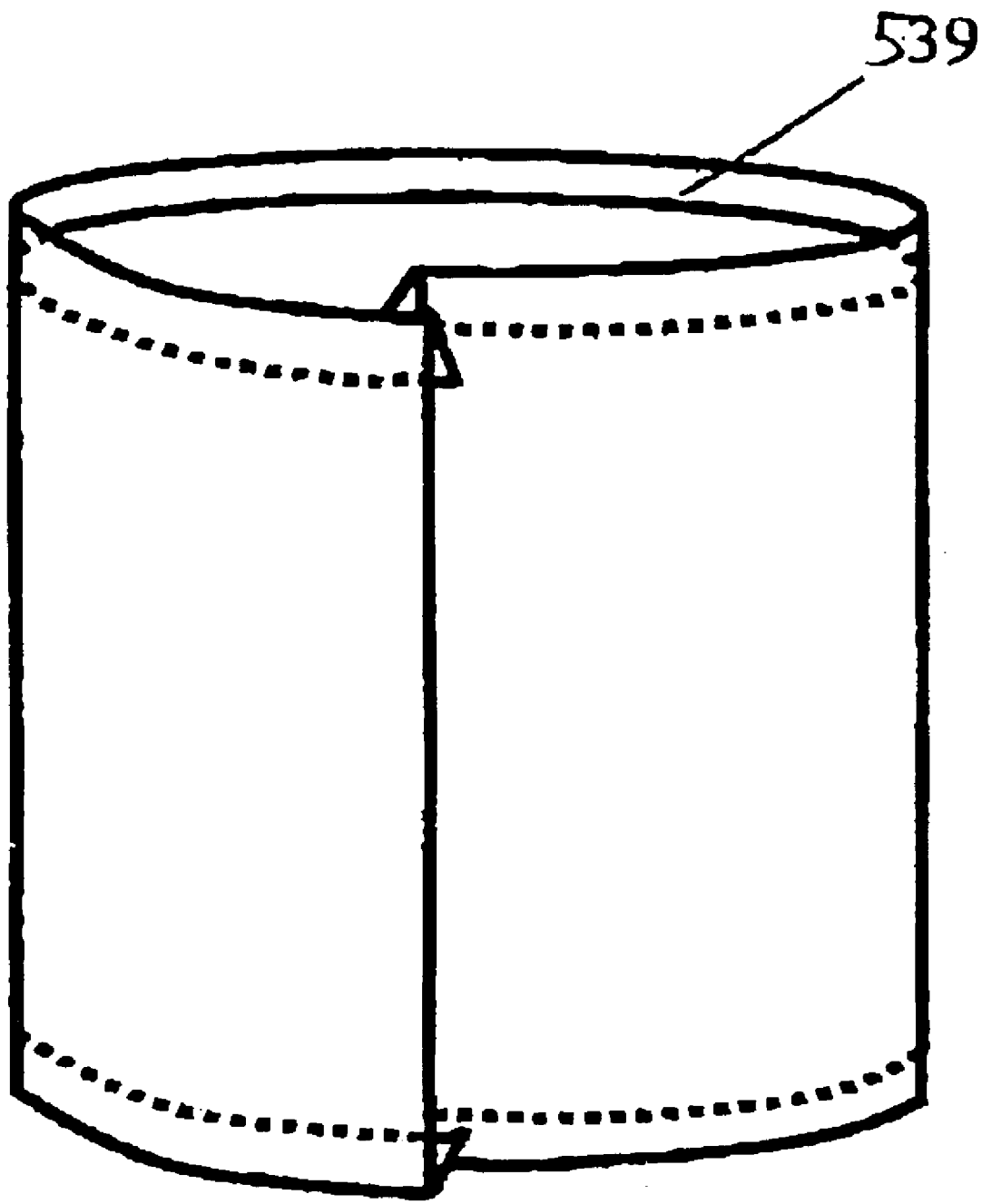
FIG. 5F is a perspective view of the vacuum heat insulator used in the electric water heater in the embodiment of the invention.

The vacuum heat insulator having both-side foil, and vacuum heat insulator having both-side deposition PEN are wound around the container 502 cylindrically so that the heat seal portion may be positioned at the outside as shown in FIG. 5D. This state is respectively defined as both-side foil outer fold and both-side deposition outer fold. One of the vacuum heat insulators having one-side foil of sample 5D is wound around the container 502 so that the heat seal portion may be positioned outside of the cylindrical form as shown in FIG. 5D so that only the aluminum foil side of the gas barrier layer may be positioned to the inside of the cylindrical form. This state is defined the one-side foil outer fold. Other vacuum heat insulators are wound around the container 502 so that the seal portion may be positioned at the inside of the cylindrical form as shown in FIG. 5F, so that only the aluminum foil side of the gas barrier layer may be at the inside of the cylindrical form. This state is defined the one-side foil inner fold.

Electric water heaters having these vacuum heat insulators are prepared. Pouring water into these electric water heaters, the electric power required for hot insulation of these electric water heaters is measured. The water is kept at temperature of 96.5° C., and the ambient temperature is 20° C. The temperature is measured after balanced sufficiently. Results of experiment are shown in Table 10.

TABLE 10

| Composition | Insulating power (Wh/h) | Insulating power based on both-side foil outer fold (Wh/h) |
|---|---|---|
| Both-side foil outer fold | 31.8 | 0 |
| One-side foil inner fold | 31.0 | −0.8 |
| One-side foil outer fold | 30.0 | −1.8 |
| Both-side deposition outer fold | 28.7 | −3.1 |

Table 10 teaches the following. In the vacuum heat insulator of one-side foil outer fold, the gas barrier layer having aluminum deposition layer can suppress the heat flowing in through the aluminum itself, and hence the insulating performance of the entire vacuum heat insulator can be enhanced. Therefore, by using such vacuum heat insulator, the electric water heater of small power consumption required for hot insulation is realized.

Embodiment 5e

A thermostatic oven at 100° C. is prepared. The following vacuum heat insulators are used.

5A: Vacuum heat insulator having same both-side foil as in experiment 5c.

5C: Vacuum heat insulator having same both-side deposition PEN as in experiment 5c.

5D: Vacuum heat insulator having same one-side foil as in experiment 5c.

In these vacuum heat insulators, the internal pressure is measured preliminarily, and all vacuum heat insulators are put in the thermostatic oven at 100° C. The heat resistance is tested. The vacuum heat insulators having both-side foil and vacuum heat insulators having one-side foil are taken out of the thermostatic oven in 1825 days and 3650 days, and the internal pressure is measured. The vacuum heat insulators having both-side deposition PEN are taken out of the thermostatic oven in 224 days, and 336 days, and the internal pressure is measured. Results of heat resistance test of these vacuum heat insulators are summarized in Table 11.

TABLE 11

| | Internal pressure (Torr) | | | | |
|---|---|---|---|---|---|
| Composition | Before | 224 days | 336 days | 1825 days | 3650 days |
| Both-side foil | 1.2 | | | 20 or less | 20 or less |
| Both-side deposition PET | 1.2 | 16 | 20 or more | | |
| One-side foil | 1.2 | | | 20 or less | 20 or more |

As clear from Table 10 and Table 11, at temperature of 100° C., in the vacuum heat insulators of one-side foil outer fold, the vacuum heat insulator having aluminum deposition layer is enhanced in the insulating performance of the entire vacuum heat insulator, and the heat resistance can be substantially improved.

Therefore, the electric water heater having the vacuum heat insulator of which laminate film positioned at the container side of high temperature side is composed of a gas barrier layer having an aluminum deposition layer formed on the entire surface, and an aluminum foil disposed at a position excluding the seal portion of the end of the laminate film can maintain an excellent heat insulating performance for a long period. As a result, the electric water heater with small power consumption for hot insulation is realized.

In the foregoing exemplary embodiments 1, 2, 3, 4 and 5, the support layer is same as the base material layer. The seal layer includes a heat fusion layer. The plastic film is same as the resin film.

According to the constitution of the embodiment an electric water heater not deteriorating in insulating performance for a long period, enhanced in thermal durability, and very small in power consumption for hot insulation is obtained.

What is claimed is:

1. An electric water heater comprising:

a container for containing liquid, a heater for heating said liquid, a tapping route for discharging water, and a vacuum heat insulator disposed around said container, wherein said vacuum heat insulator comprises a laminate bag, and an insulating core placed in said laminate bag, an inside of said laminate bag is evacuated to vacuum, said laminate bag comprises a laminate film, said laminate film includes a base material layer, a deposition layer evaporated on the surface of said base material layer, a protective layer disposed at the face side, and a seal layer disposed at the back side, said base material layer and said protective layer comprise a plastic film having a glass transition point of 87° C. or higher, said seal layer and said base material layer are mutually adhered by an adhesive layer, and said deposition layer and said protective layer are mutually adhered by an adhesive layer.

2. The electric water heater of claim 1, wherein said base material layer has a first base material layer and a second base material layer, said deposition layer has a first deposition layer and a second deposition layer, and said first deposition layer and second deposition layer are adhered face to face.

3. The electric water heater of claim 1, wherein said laminate film further has a metal foil.

4. The electric water heater of claim 3, wherein said laminate bag has a seal portion having seal layers mutually fused by heat, and said metal foil is disposed in a region excluding the seal portion at the end positioned at the container side.

5. The electric water heater of claim 1, wherein only the laminate film formed at one side of said laminate bag further has a metal foil, and said vacuum heat insulator is disposed so that the laminate bag side having the metal foil is positioned at the high temperature side.

6. The electric water heater of claim 1, wherein said base material layer has polyethylene naphthalate.

7. The electric water heater of claim 1, wherein said laminate bag has a seal portion having seal layers mutually fused by heat, and said seal portion is disposed as being folded to the opposite side of said container.

* * * * *